Figure 1:
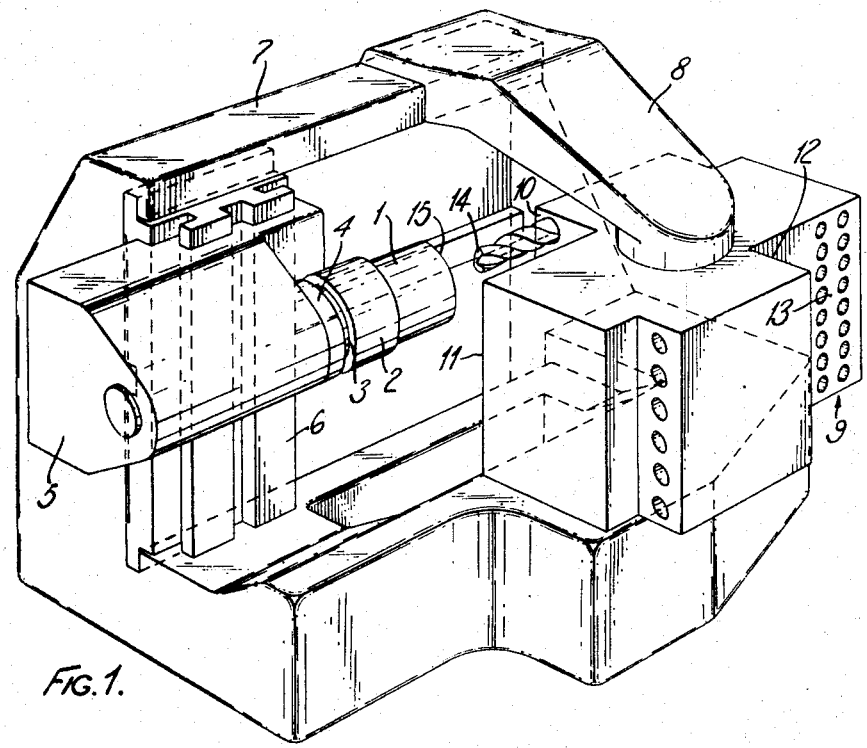

United States Patent [19]
Williamson et al.

[11] 3,710,466
[45] Jan. 16, 1973

[54] MACHINE TOOLS AND MORE PARTICULARLY TO DATA-CONTROLLED MACHINE TOOLS

[75] Inventors: David T. N. Williamson; James Moffat Hutchison; Kenneth C. Wilson, all of London, England; Charles Henri Kahn; Leon Fayolle, both of Paris, France

[73] Assignee: Molins Machine Co., Limited, Deptford, London, England; by said Hutchison, Williams and Wilson

[22] Filed: Sept. 30, 1970

[21] Appl. No.: 77,029

Related U.S. Application Data

[63] Continuation of Ser. No. 774,545, Nov. 8, 1968, abandoned, which is a continuation of Ser. No. 611,708, Jan. 5, 1967, abandoned, which is a continuation-in-part of Ser. No. 567,243, July 22, 1966, abandoned.

[30] Foreign Application Priority Data

| | | |
|---|---|---|
| Jan. 28, 1966 | Great Britain | 3,997/66 |
| Feb. 3, 1966 | Great Britain | 4,845/66 |
| Feb. 4, 1966 | Great Britain | 5,059/66 |
| June 17, 1966 | Great Britain | 27,148/66 |
| July 14, 1966 | Great Britain | 31,722/66 |

[52] U.S. Cl. ..........................29/27 R, 82/28, 90/20, 408/35
[51] Int. Cl. ..............................................B23b 11/00
[58] Field of Search ........29/27; 82/28; 90/20; 408/35

[56] References Cited

UNITED STATES PATENTS 1,634,534   7/1927   Brewer .............................82/30 X

FOREIGN PATENTS OR APPLICATIONS

| | | | |
|---|---|---|---|
| 122,274 | 1/1919 | Great Britain | 90/20 |
| 650,469 | 2/1951 | Great Britain | 90/20 |

*Primary Examiner*—Francis S. Husar
*Attorney*—Emory L. Groff and Emory L. Groff, Jr.

[57] ABSTRACT

Eleven embodiments of machine tool particularly intended for data-control are disclosed. A rotating workpiece is moved in relation to a lathe tool which is stationary during cutting. Tools such as drills are also provided for working on the end face of the workpiece. In some embodiments the workpiece is movable in two directions mutually perpendicular to its rotational axis as well as along that axis. In some embodiments the machine may act as a milling, drilling or boring machine as well as a lathe. In some embodiments the rotatable workpiece holder may be replaced by a tool holder.

89 Claims, 27 Drawing Figures

3,710,466

Inventors
D.T.N.Williamson
J.M.Hutchison
K.C.Wilson
C.H.Kahn
L.Fayolle,

Inventors
D.T.N. Williamson
J.M. Hutchison
K.C. Wilson
C.H. Kahn
L. Fayolle,

Inventors
D.T.N. Williamson
J.M. Hutchison
K.C. Wilson
C.H. Kahn
L. Fayolle

Inventors
D.T.N. Williamson
J.M. Hutchison
K.C. Wilson
C.H. Kahn
L. Fayolle

Inventors
D.T.N. Williamson
J.M. Hutchison
K.C. Wilson
C.H. Kahn
L. Fayolle

Inventors
D.T.N.Williamson
J.M.Hutchison
K.C.Wilson
C.H.Kahn
L.Fayolle

Inventors
D.T.N. Williamson
J.M. Hutchison
K.C. Wilson
C.H. Kahn
L. Fayolle

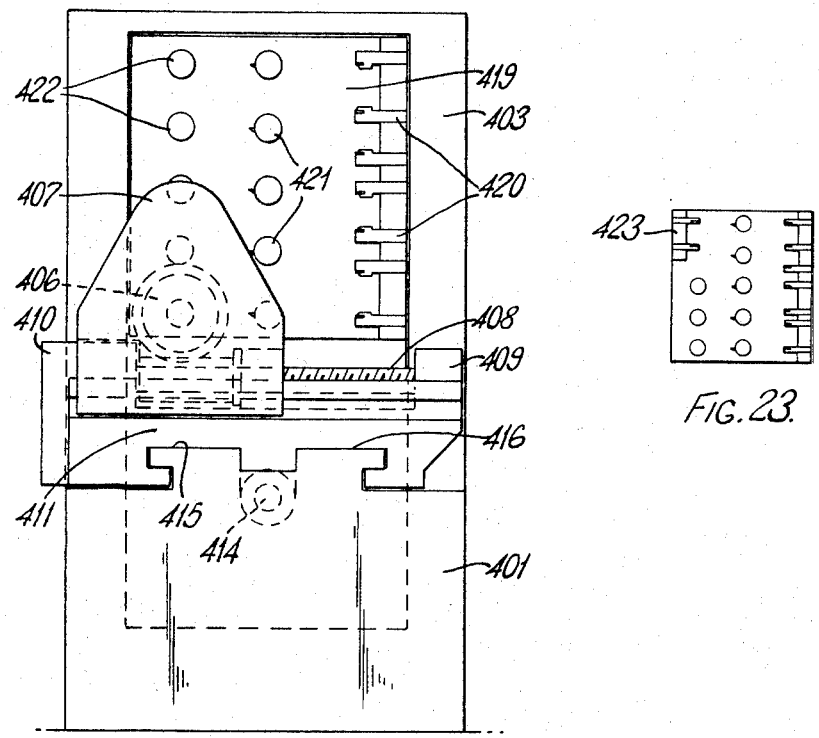
FIG. 22.
FIG. 23.
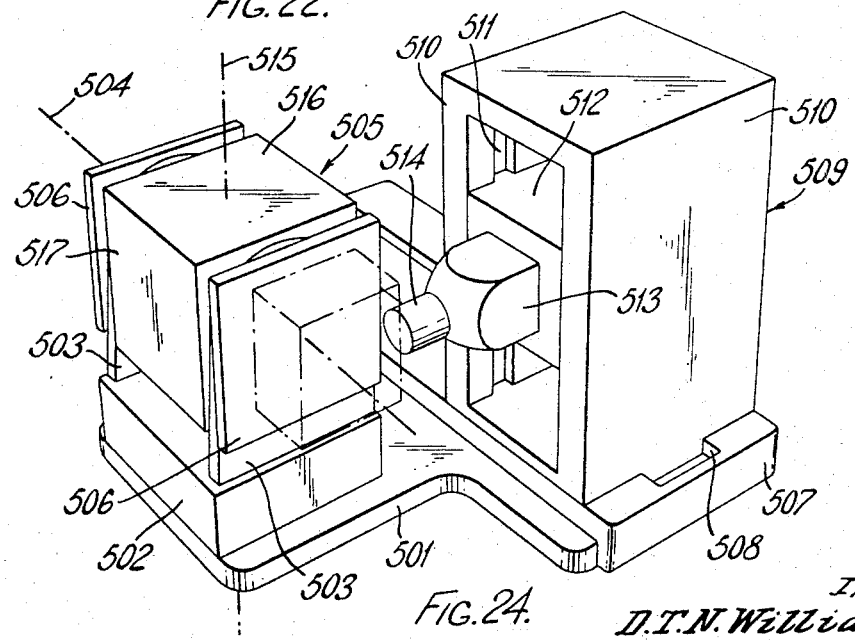
FIG. 24.

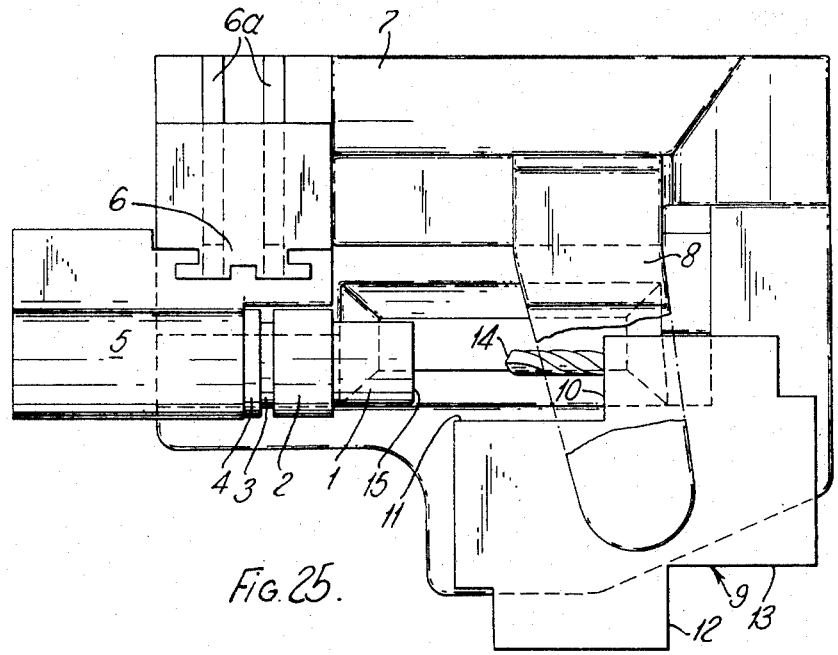

MACHINE TOOLS AND MORE PARTICULARLY TO DATA-CONTROLLED MACHINE TOOLS

CROSS-REFERENCES TO RELATED APPLICATIONS

This application is a continuation of application Ser. No. 774,545 filed Nov. 8, 1968, now abandoned, which in turn is a continuation of application Ser. No. 611,708 filed Jan. 5, 1967, now abandoned, which is in turn a continuation-in-part of our copending Application Ser. No. 567,243 filed July 22, 1966, now abandoned.

This invention concerns improvements relating to machine tools and more particularly to data-controlled machine tools.

The term "a data-controlled machine tool" is intended to mean a machine tool in which a desired relative motion is produced between a workpiece and a cutting tool under the control of information supplied to a control unit (e.g. the information may be recorded on punched or magnetic tape or supplied by a computer) in such manner as to be repeatable for successive components of a batch but rapidly changeable upon completion of each batch of like components.

Despite recent developments in forging, extrusion, powder metallurgy, electro-chemistry, high-energy-rate forming and other methods, the most important engineering processes involved in the manufacture of components, certainly in small batches of, say, 100 or less, are metal cutting processes, e.g. milling, turning, or other conventional ways of physically removing unwanted material.

It is well appreciated that the conventional lathe is a relatively inefficient piece of apparatus. It performs its function reasonably well, i.e. with the aid of a variety of cutting, drilling and boring tools, it transfers a crude piece of material, usually metal, into a desired shape within the limits dictated by the skill of the operator and its own design performance. However its lack of efficiency can best be expressed by stating that in proportion to the time it stands idle without any material removal taking place, its actual cutting time is low. Efficiencies are generally measured in terms of "floor to floor time" which is the total elapsed period between the moment a specific workpiece or the first of a batch of workpieces is lifted from the floor for insertion into the lathe and the moment when the complete component or portion of the component or the last of the batch of components is removed from the lathe to be returned to the floor. For conventional hand-operated lathes, the efficiency, i.e. proportion of total cutting time to floor to floor time is 10–15 percent. The remainder of the time is lost in a series of necessary but slow manual operations, such as fixing the workpiece to the lathe's headstock, tool setting and changing, interpreting drawings and reading dials, verniers, micrometers, clock gauges etc. Similar considerations apply to other machine tools such as milling machines.

To improve efficiencies and to increase accuracy by the elimination of manual limitations, numerically controlled lathes have been proposed and used. In these machines the tool and its carrying mechanism, i.e. the carriage or saddle and the slides, are controlled and operated by actuators or leadscrews in response to signals originating from a programme fed into a control unit. The efficiency, measured in the same terms as the figures previously quoted, of existing numerically controlled lathes is of the order of 30 percent, or at least twice as good as that of manually operated machines, while the accuracy of work is considerably enhanced.

The generation of form by means of a lathe is based on geometric fundamentals. When cutting tools are used, whether external or for internal boring, material is removed from the workpiece in one plane only. This is designated the "cutting plane". The tip of the tool can only move in this plane but can move freely into every part of a finite area of it, the shape and extent of the area being dependent on the design of the lathe itself, i.e. its length between centers; cross-slide travel etc. By interposing a workpiece so that its surface intersects the cutting plane the tool tip now has its freedom of movement restricted thereby. If the workpiece is then rotated, conditions exist by which metal can be removed by the tool tip from the workpiece, this metal removal always being in the cutting plane. It therefore follows that the axis of rotation of the workpiece must also lie in the cutting plane since, if it did not, there would always remain a volume of material which the tool tip could never reach. If, for instance, the tool tip were to be positioned, say, 2 mm lower than the cutting plane then it would be possible to carry out all cutting operations on the workpiece outside a cylinder of 4 mm diameter. Such a machine tool would hardly be practicable but even less practicable would be the fact that neither a parting tool nor a drill could be used on a machine with such a configuration. For normal lathes, i.e. center lathes, capstans, turret lathes, profile lathes, automatic lathes etc., this plane is generally horizontal. However in certain automatic lathes the cutting plane may be at an inclined angle and in certain machines cutting is carried out by more than one tool operating simultaneously. In this case metal removal will take place in more than one plane with all the planes intersecting through the axis of the workpiece.

It will therefore be seen that for any position of the workpiece axis there exists numberless potential cutting planes all intersecting on that axis. If the workpiece axis were to be horizontally rotatable there would then come into existence for each new position a new family of potential cutting planes. There are, in fact, an infinity of such potential planes. To change a potential plane into an actual cutting plane it is only necessary to introduce a tool tip. Thus a finite cutting plane is a plane having boundaries dependent on the actual configuration of the machine tool and defined as being that plane containing the workpiece axis and at least one cutting tool tip.

In what follows, where the expression "finite cutting plane" is used it is to be interpreted as having the above definition. The invention however is not limited to lathes as normally understood but applies to other machine operations such as milling, boring, grinding and drilling.

According to the present invention there is provided a machine tool in which material is removed from a rotating workpiece by a tool comprising a rotatable workpiece holder, means to cause said holder to move in two orthogonal directions so that the geometric center of the workpiece can move to and remain in each and every point of a finite cutting plane which is defined by the workpiece axis and the tool tip, the tool remaining fixed during the period of material removal.

The means to cause said workpiece holder to move may additionally cause said workpiece holder to move in a third orthogonal direction so that the workpiece holder is movable into any selected cutting plane and is movable in two orthogonal directions in any selected cutting plane.

Further according to the invention there is provided a data-controlled machine tool comprising a workpiece holder, means to rotate said workpiece holder, mounting means for a plurality of tools, means to cause said holder to move in two orthogonal directions so that the geometric center of the workpiece can move to and remain in each and every point of a finite cutting plane which is defined by the work-piece axis and the tool tip, and automatic control means responsive to a data input for selecting one of the tools to be used with the workpiece and for controlling movement in the two orthogonal directions in the selected cutting plane defined by the axis of the workpiece and the tip of the selected tool.

The means to select one of the tools may cause the workpiece holder to move in a third orthogonal direction into the selected cutting plane.

Batch production is generally accomplished today by issuing components into manufacture on an "operation" basis, i.e. the work to be done is split down into separate operations, sometimes involving as many as twenty operations for one part. Each of these may involve transferring the part from one machine tool or process to another and then to a third and fourth and so on, but even when many of the operations are confined to one machine, changes in the set-up or position of the workpiece can be frequent. These changes in set-up result in the machine tool not cutting during the change-over period so that the ratio of cutting time to total working time is of the order of 15–20 percent. Where the component moves from machine to machine the situation may be far worse. Even with good organization it is rarely possible to manage a large engineering shop so that components spend less than a day between operations. Frequently this period may be nearer to one week. Even with only a few operations, the queueing problems associated with machine loading lead to a total manufacturing cycle which in some circumstances can be between 3 months and 6 months.

The number of components forming a workpiece float or work in progress may be extremely high, in some cases as high as one million, and this may be the minimum necessary with current production control methods to maintain stability and give good machine loading. Such work-in-progress represents a large investment in partly finished material as well as serious delay in delivery times. An extremely complex and expensive production control system is required to progress the work from operation to operation and, although a computer can be used to improve the situation, such measures are no more than a palliative which does little to remove the main disadvantages of the system.

Consequently an object of the invention is to provide a machine tool better adapted to the manufacture of small batches of machined components.

Some of the tools may be disposed on the faces of a block member opposed to the holder, said member being pivotable so as to present each of its faces separately to the holder while other of said tools may be disposed radially of said axis.

The workpiece holder may be adaptable to grip a tool in place of the workpiece, or be replaceable by a tool holder, and at least one face of the block may be adapted to carry a plurality of tools from which the toolholder can select and withdraw a tool, datuming means to cause the toolholder to grip the selected tool firmly with its free end at a predetermined distance from the holder, and workpiece holding means on a face of the block member which can be opposed to the toolholder for the selected tool gripped in the toolholder to remove material from the workpiece also being provided.

Figure 2:
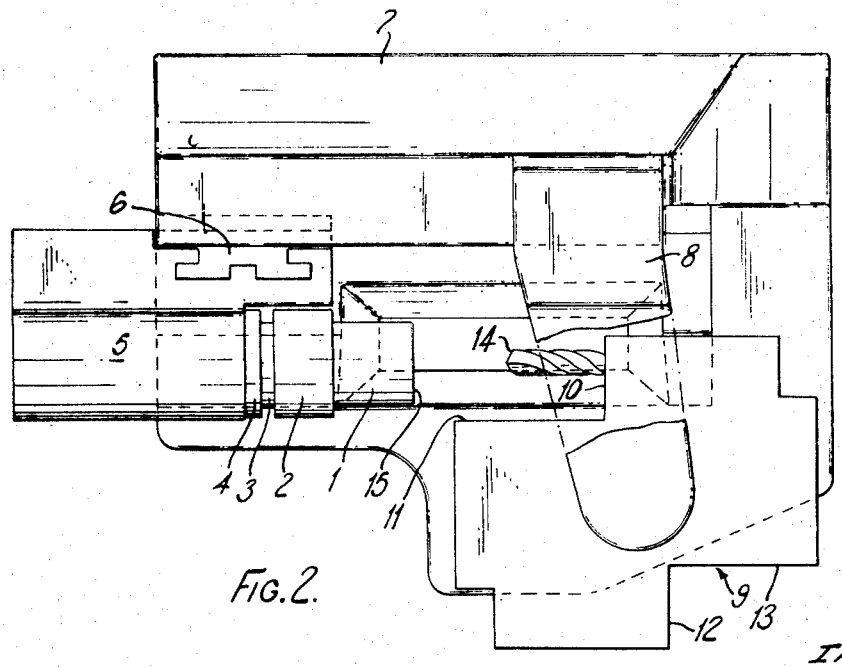
Figure 3:
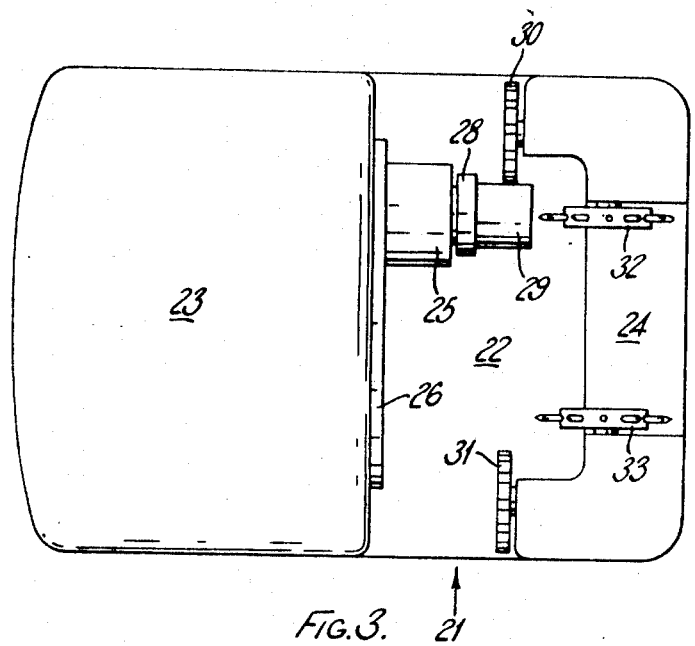
Figure 4:
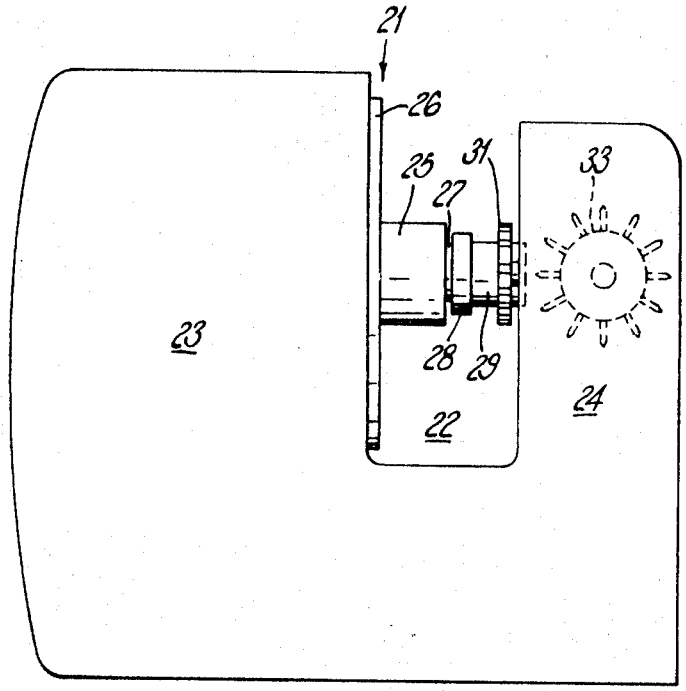
Figure 5:
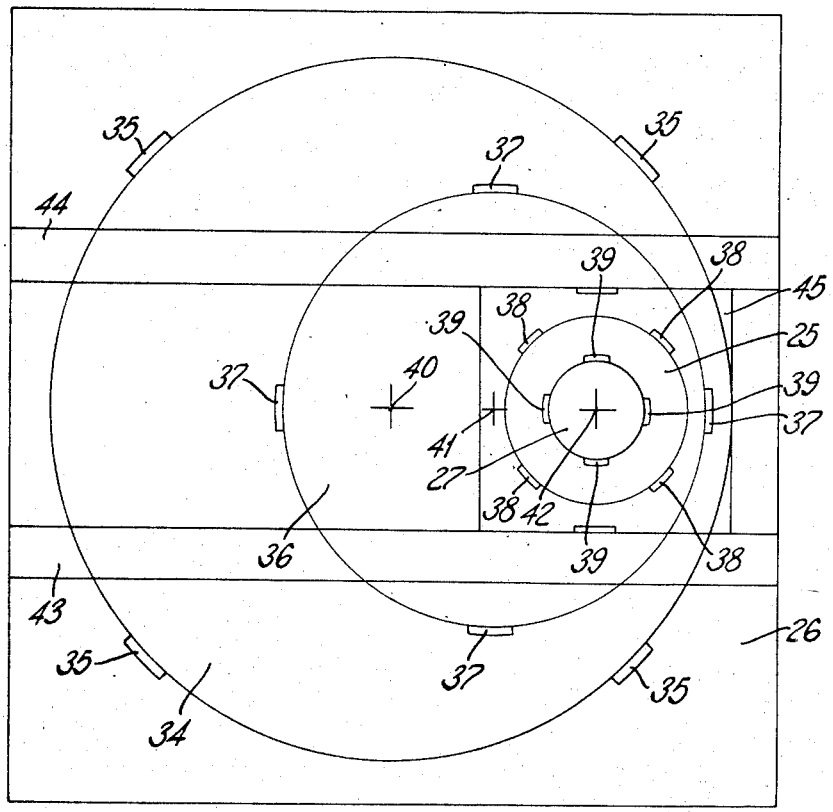
Figure 6:
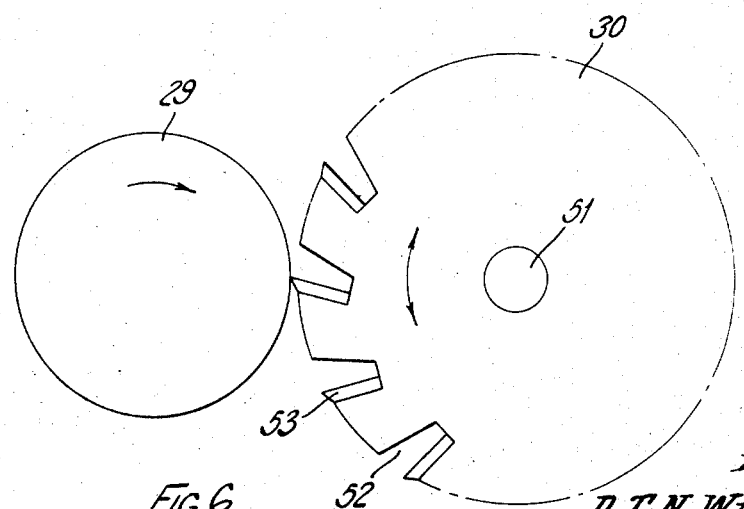
Figure 7:
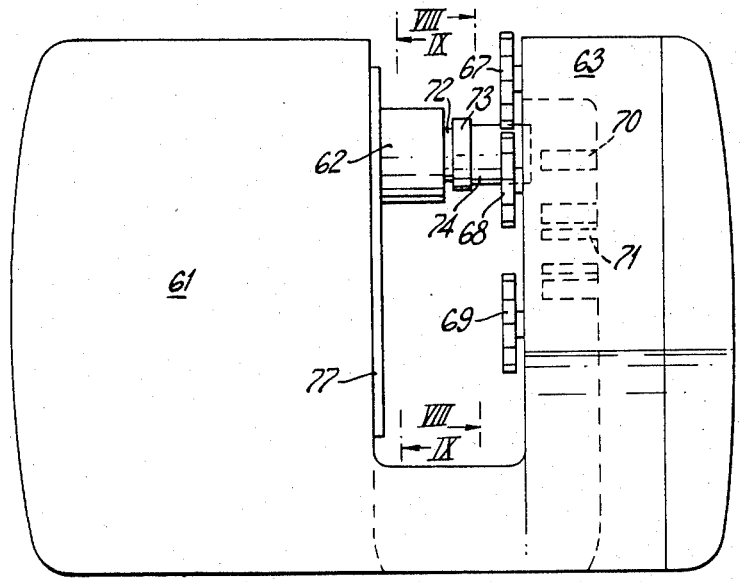
Figure 8:
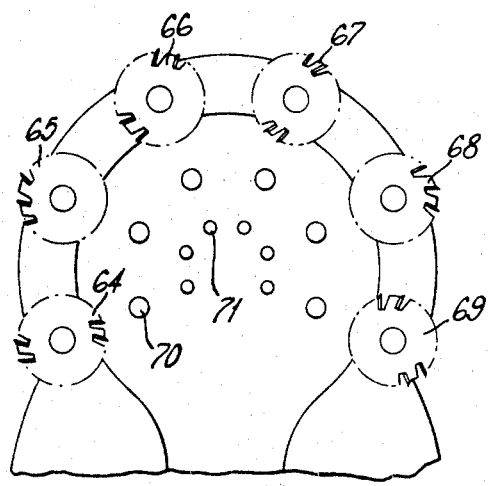
Figure 9:
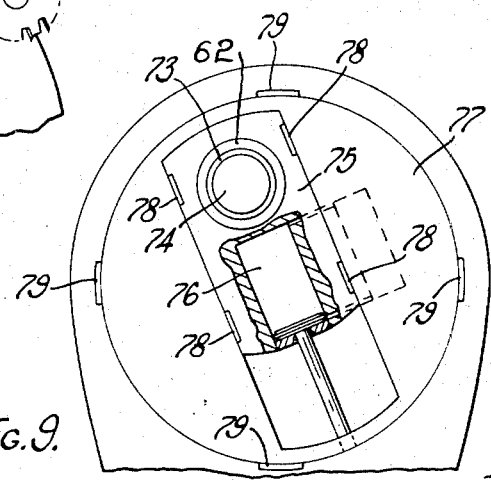
Figure 10:
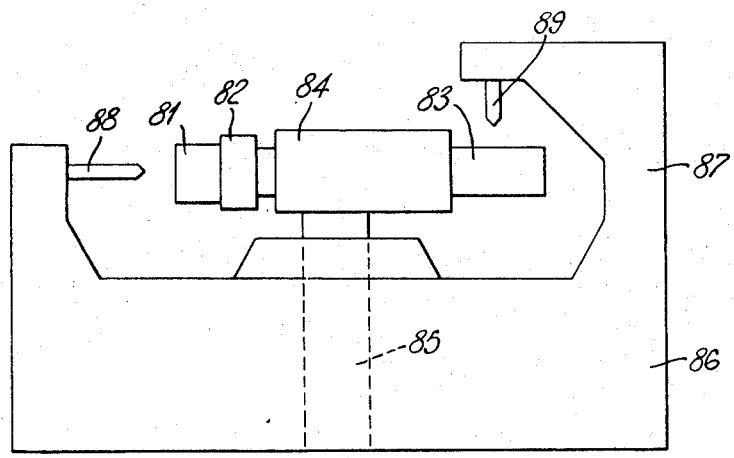
Figure 11:
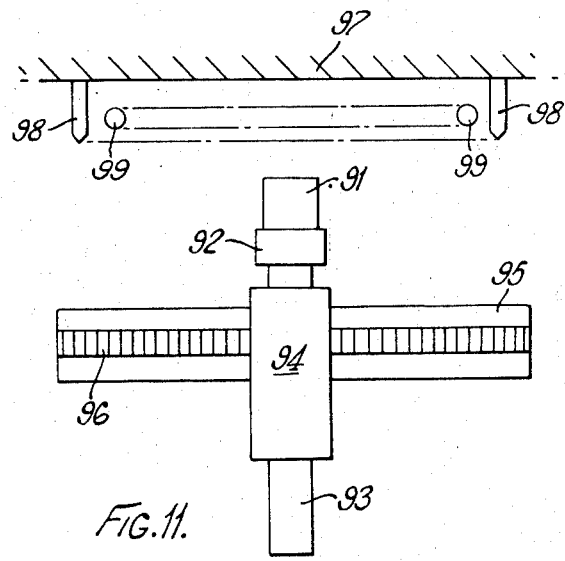
Figure 12:
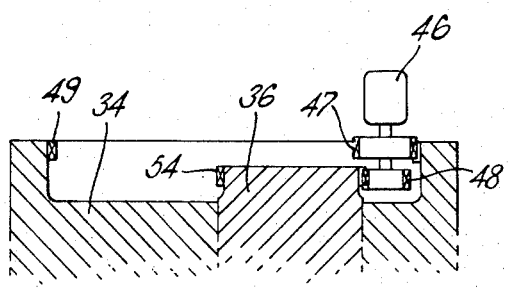
Figure 13:
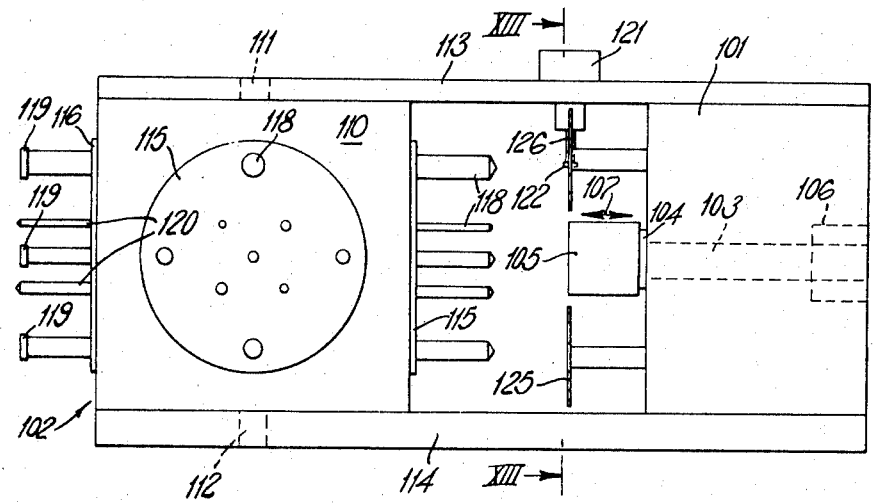
Figure 14:
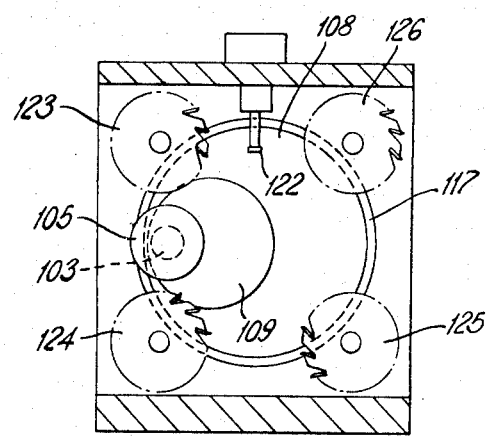
Figure 15:
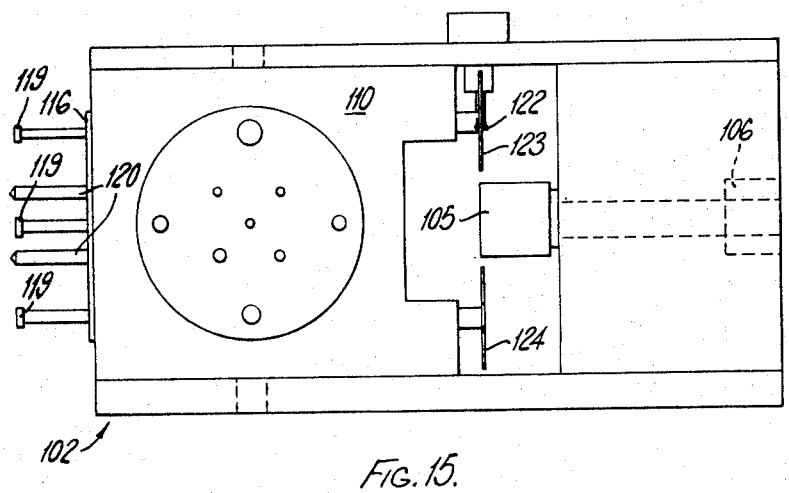
Figure 16:
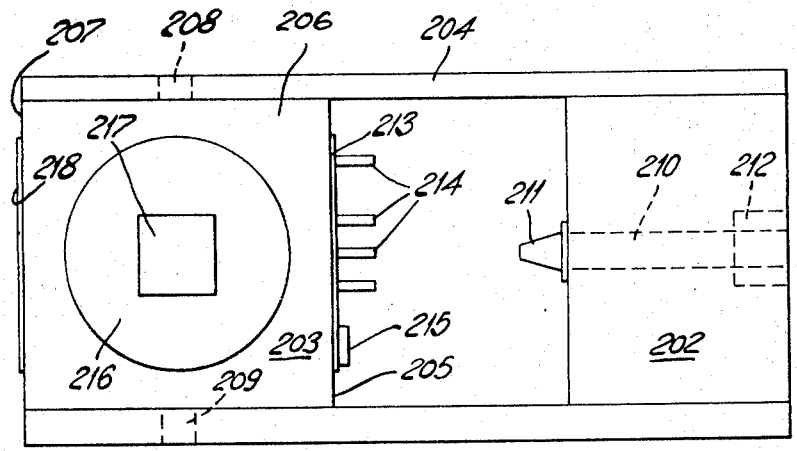
Figure 17:
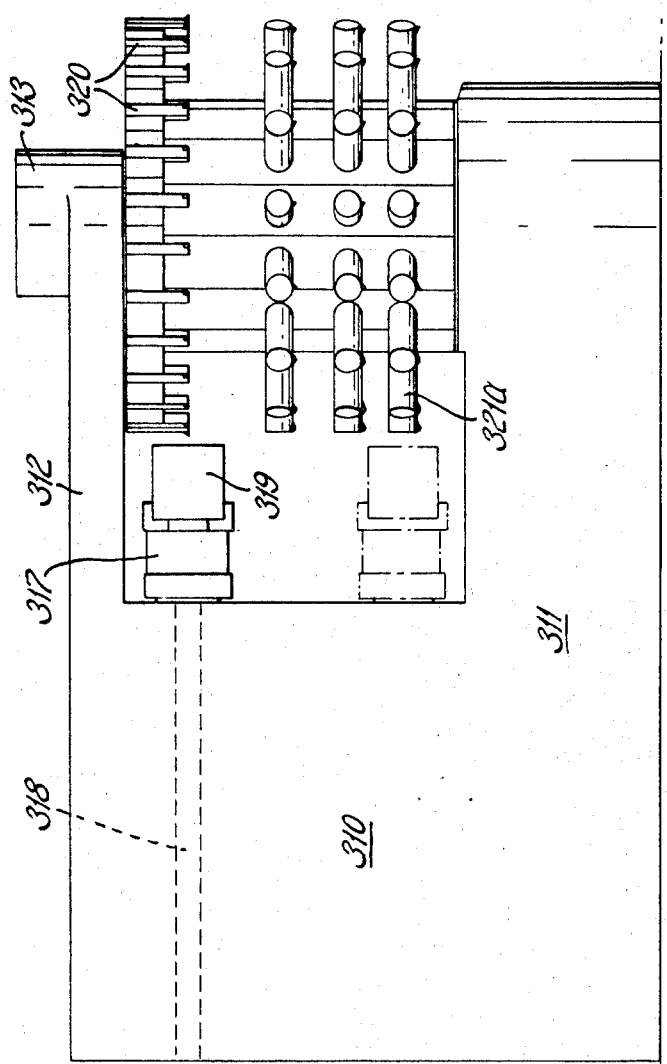
Figure 18:
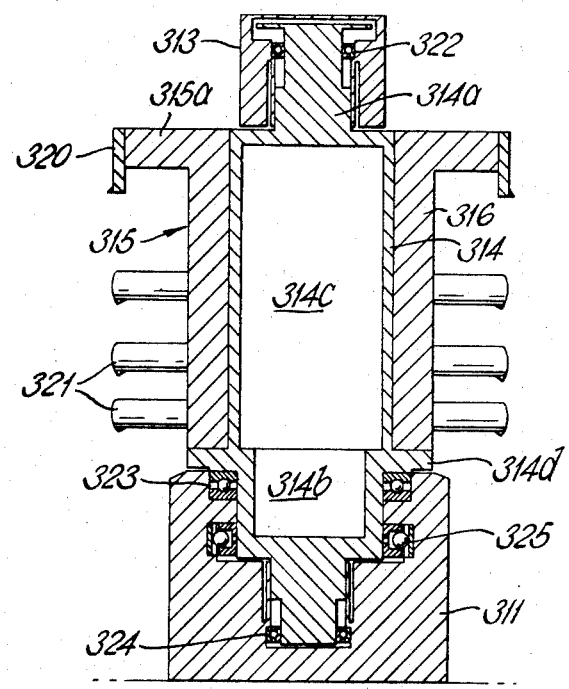
Figure 19:
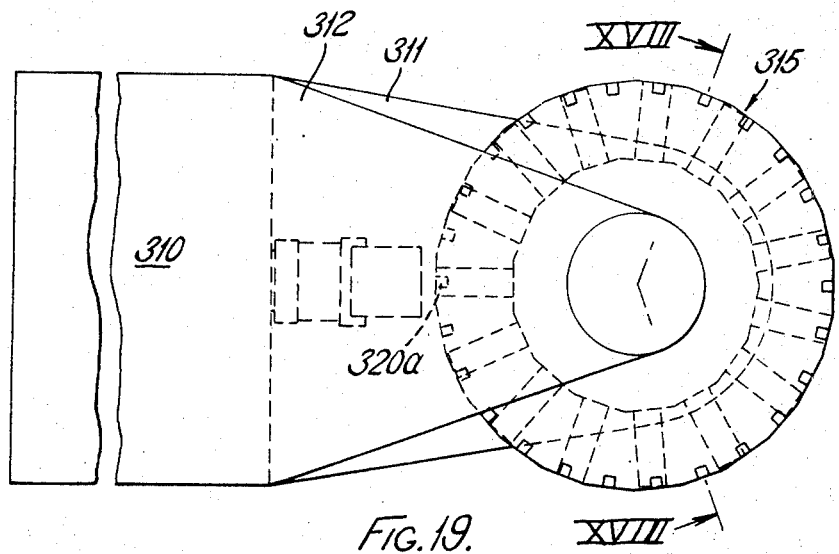
Figure 20:
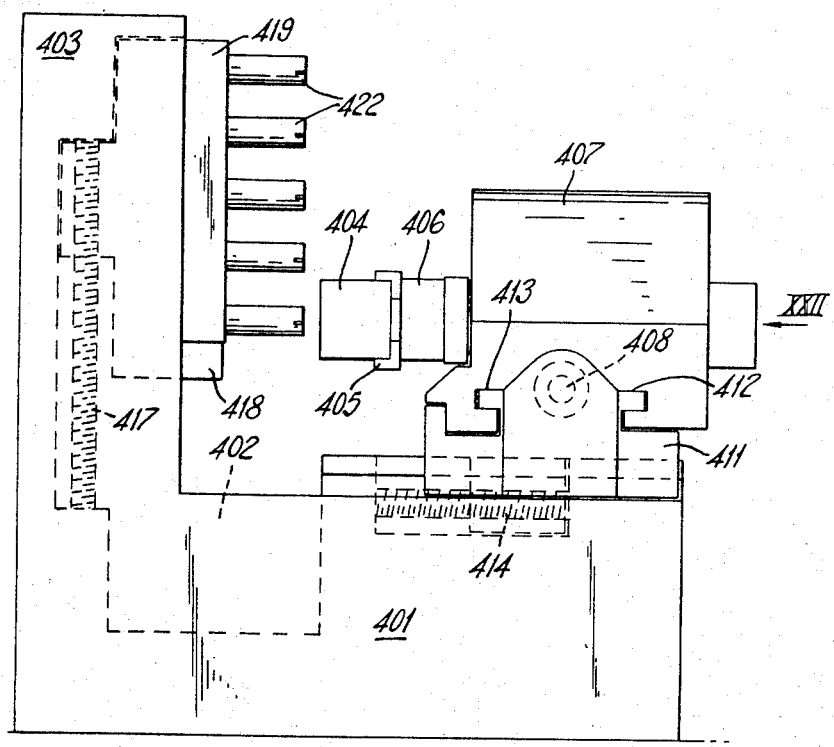
Figure 21:
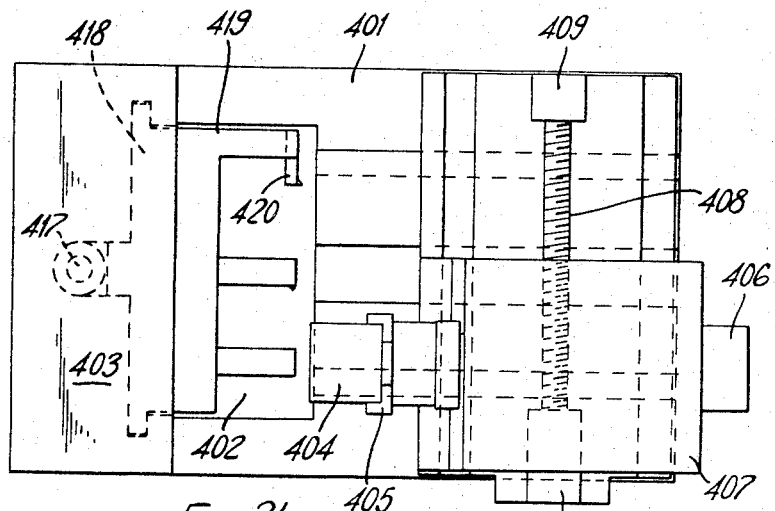
Figure 27:
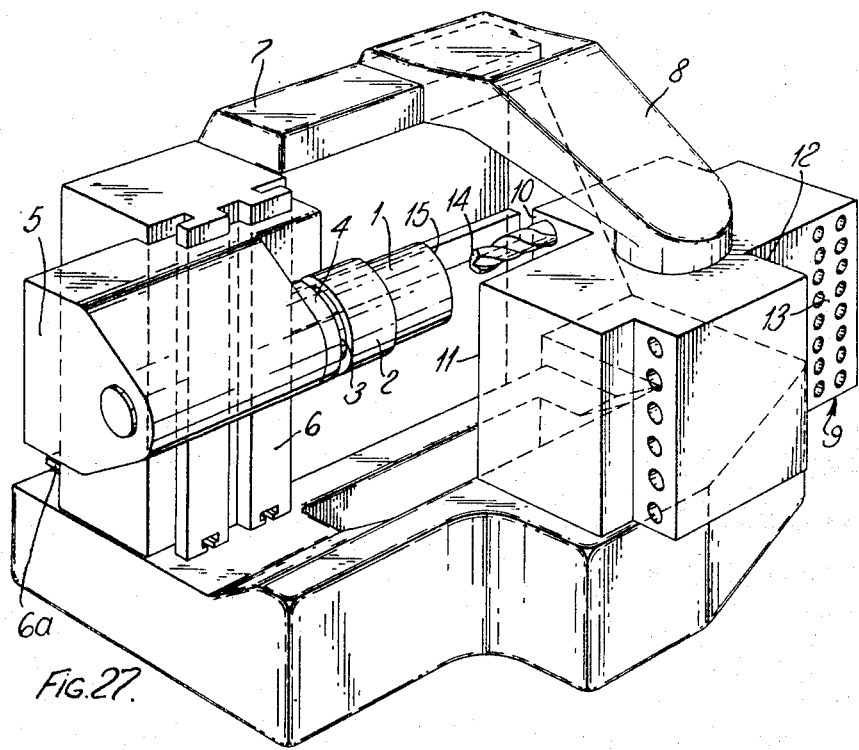

The invention will now be described by way of example with reference to the accompanying drawings of which:

FIG. 1 is a perspective view of a numerically controlled lathe according to the invention, FIG. 2 is a plan view of FIG. 1, FIG. 3 is a plan view of a second embodiment, FIG. 4 is a side view of FIG. 3, FIG. 5 is a diagrammatic showing of the arrangement of part of the embodiment shown in FIGS. 3 and 4, FIG. 6 is a diagrammatic showing of the arrangement of a further part of the embodiment of FIGS. 3 and 4, FIG. 7 is a diagrammatic arrangement of a third embodiment, FIG. 8 is a section on lines VIII—VIII of FIG. 7, FIG. 9 is a section on lines IX—IX of FIG. 7, FIG. 10 is an arrangement of a fourth embodiment, FIG. 11 is an arrangement of a fifth embodiment, FIG. 12 is a detail of a drive mechanism, FIG. 13 is a diagrammatic side view of a sixth embodiment of the invention, FIG. 14 is a section on the line XIIII—XIIII of FIG. 13, FIG. 15 is a diagrammatic view of a seventh embodiment of the invention, FIG. 16 is a diagrammatic view of an eighth embodiment of the invention, FIG. 17 is a side elevation of a ninth embodiment of the invention, FIG. 18 is a section on the line XVIII—XVIII of FIG. 19, FIG. 19 is a plan view of the ninth embodiment, FIG. 20 is a side elevation of a tenth embodiment of the invention, FIG. 21 is a plan view of FIG. 20, FIG. 22 is an end elevation in the direction of the arrow XXII in FIG. 20, FIG. 23 is a detail of a pallet and tools drawn to a different scale to that shown in FIGS. 20, 21 and 22, FIG. 24 is a perspective view of an eleventh embodiment of the invention, FIG. 25 is a plan view of a further embodiment of a numerically controlled lathe shown in FIGS. 1 and 2;

FIG. 26 is a diagrammatic view of a further embodiment of the invention shown in FIG. 16; and FIG. 27 is a perspective view of the further embodiment of a numerically controlled lathe shown in FIG. 25.

In FIG. 1, a workpiece 1 is held in a chuck 2 which is fixed to a spindle 3. The spindle 3 rotates within a quill 4 which is slidable in an axial direction i.e. along the lathe's X axis, within a headstock 5. The spindle 3 is driven by a hydraulic motor or other suitable means, while the axial movement of the quill 4 is effected by a hydraulic or electrically operated actuator. The hydraulic motor and actuator are both contained within the headstock 5 and thus cannot be seen in either FIG. 1 or FIG. 2. The actuator holds the quill 4 in any selected position relative to the headstock 5, and, therefore, at any desired position along the machine's X axis.

The X axis is defined as the axis of the lathe, i.e. along its bed. The Y axis then becomes a vertical axis perpendicular to the X axis while the Z axis is perpendicular to both X and Y axes and is in the direction of the tool feed in a conventional center lathe. When X, Y and Z axes are referred to hereinafter, they are to be taken as having the above meanings.

The headstock 5 has a degree of freedom of movement in a vertical direction being movable up and down a slide 6 on the frame 7 of the lathe. This movement can be achieved in any convenient way, i.e. by a hydraulic actuator or by a mechanical linkage such as a nut and leadscrews. Whatever method is used, the actuator is capable of holding the headstock 5 in any desired position along the lathe's Y axis (i.e. vertically).

An arm 8 of the frame 7 carries a vertical column, the top part only of which can be seen in FIG. 1, about which is pivotable a tool store indicated generally by reference numeral 9. The tool store 9 consists of four separate magazines 10, 11, 12 and 13, arranged in pairs, 10 and 11 being one pair and 12 and 13 the other. Of each pair one magazine 11 and 13 contains cutting tools while the other 10 and 12 contains drills, boring tools, reamers, etc. i.e. those tools which, like drill 14, are used for metal removal from the end face 15 of the workpiece 1. The tool store 9 can be locked in two positions. One position is shown in FIGS. 1 and 2 in which the magazines 10 and 11 are directed towards the workpiece 1. The tool store 9 is rotated through 180° to the other position so that the other pair of magazines 12 and 13 are directed towards the workpiece.

The tools carried in the magazines 11 and 13 are adapted for cutting from underneath the workpiece in the manner disclosed in copending Williamson et al. U.S. application Ser. No. 596,323 filed Nov. 22, 1966, now U.S. Pat. No. 3,472,103, so that during a turning operation the holding and reaction forces acting on the tool produce a resultant force so directed that tool vibration exerted thereby is predominantly longitudinal vibration. Preferably, an elongated tool is employed and is arranged so that the longitudinal axis of the tool extends substantially parallel to a tangent to the surface of the workpiece time" turned through the point of contact between the tool and the workpiece, a "tip" being embedded in the side of the tool. Alternatively, the cutting tip may be sited on the longitudinal axis of the tool, and the tool is so mounted that its axis coincides with the line of action of the resultant of the holding and reaction forces. Thus to remove metal from the cylindrical surface of the workpiece 1 the headstock 5 is lowered along the slide 6. Traverse of the tool along the workpiece is achieved by axial movement of the quill 4 within the headstock 5.

Variations are possible on the apparatus shown in FIGS. 1 and 2. For instance the quill 4 might not be slidable within the headstock 5. Movement along the X axis might equally be obtained by making the slide 6 itself slidable along the bed of the machine. Further, the use of the cutting tools in the position described is not necessary if the headstock of the lathe is given an extra lineal movement along the Z axis as shown in FIGS. 25 and 27 wherein additional slide movable along the Z axis is provided.

The arrangement of magazines in pairs is such that one pair may be serviced by replacing worn tools or tool tips, tool changing, etc. while the other pair is in the operative position in relation to the workpiece. Thus the magazines 10 and 11 can be in use while the magazines 12 and 13 are readily available for servicing.

Operation of the lathe is controlled from a console which is not shown but which conforms generally to that now universally known as numerical control. In this a command signal originating from a programmed input is issued to the actuators, to the tool store, to the spindle drive unit and to any other part of the mechanism formerly manually controlled. This signal is compared with a feedback signal dependent on the actual performances of the actuator, unit, etc. commanded. Any difference between the two signals then forms the basis of the next command signal. Such is a well proved system and any adaptation of it using, for instance, potentiometers, synchros, diffraction gratings, etc. can be used in the control of this lathe.

In FIGS. 3 and 4 a second embodiment of a numerically controlled lathe is shown diagrammatically. This consists of a frame 21 having a gap 22 between two parts of the frame. On one side of the gap 22 is the headstock portion 23 of the frame and on the other the tool carrying portion 24. On the headstock portion 23 is mounted a quill 25 which is movable along the Y and Z axes of the machine, being mounted on a plate 26. Within the quill 25 is a spindle 27 which together with the quill 25 can move axially, i.e. along the X axis of the lathe. The spindle 27 has fixed to it a chuck 28 to which is held workpiece 29.

The tool carrying portion 24 of the frame 21 is "U" shaped in plan view, see FIG. 3. At the ends of the arms of the "U" there are mounted tool magazines 30 and 31. Each of these is in the form of a rotatable indexable disc having cutting tools mounted around its periphery. Each disc holds 12 tools or tool tips and can be locked in position so that any of these twelve tools can be directed towards the workpiece. In addition the portion 24 is provided with two other magazines 32 and 33, these being disposed in a plane transversely of that of the cutting tool magazines 30 and 31 and being filled with drilling and boring tools.

Operation of the lathe is controlled from a numerical control console NCC. Command signals for operation of the lathe originate from a programmed input in the console. With respect to the four connections on the left in FIG. 3, connection 46A carries the control signals directed to the motor 46 (FIG. 12), connection 26A carries the control signals for controlling rotation of the plate 26, connection 25A carries the control signals for controlling movement of the quill 25, and connection 27A carries the signals for controlling rotation of the spindle 27. The two connections 46A and 26A collectively control movement in the X and Y directions, while the connection 25A controls movement in the Z direction.

The other four connections 30A, 32A, 31A and 33A carry control signals to control rotation of the tool turrets 30, 32, 31 and 33 respectively. Consequently, they control tool selection.

In FIG. 5 there is shown a diagrammatic view of the plate 26 as seen when looking along the X axis of the lathe. Mounted within the plate 26 is an outer eccentric member 34, which is held rigidly away from the plate 26 by hydrostatic bearings 35. The member 34 is rotatable in either direction. An inner eccentric member 36 is eccentrically mounted within the outer member 34 from which it too is rigidly held by hydrostatic bearings 37. The inner member 36 is also rotatable in either direction while both members are geared together as will be described later in relation to FIG. 12, but they could be independently driven. Eccentrically mounted within the inner member 36 is the quill 25 which is separated therefrom by hydrostatic bearing 38. The quill 25 is not rotatable but has an ability to move along the lathe's X axis as already described. Finally concentrically mounted within the quill 25 is the spindle 27 which is separated therefrom by hydrostatic bearings 39 and which is rotatable therein. Point 40 is the center of the member 34; 41 the center of the member 36 and 42 the center of the quill 25. If the distance between the points 40 and 41 is equal to the distance between the points 41 and 42 it is possible for the point 42 to move in a straight horizontal line by rotating the disc 34 in one direction while the disc 36 is rotated in the opposite direction.

43 and 44 are guides fixed to the plate 26. 45 is a sliding member whose movement is restricted to sliding between the guides 43 and 44. The sliding member 45 is also attached to the quill 25 in such a way as to prevent the latter rotating i.e. by means of a slot not shown. FIG. 12 shows how the drive is effected. A motor 46 which may be hydraulic drives pinions 47 and 48 which engage respectively with an internal gear 49 on outer member 34 and an external gear 54 on inner member 36. The arrangement is such that both the members 34 and 35 are rotated with equal angular velocity though in opposite directions. The result is straight line motion for the quill 25. By fixing the plate 26 to a rotatable member within the headstock portion 23, the guides 43 and 44 which are fixed to the plate 26 can be rotated into any desired position. Thus the sliding member 45 can have its linear movement directed along any desired axis and, therefore, along any desired cutting plane.

Provided that the members 34 and 36 have the same eccentricities, and are rotated in opposite directions at equal angular velocities, as described above, then the required straight line motion is obtained without the guides 43 and 44, although the guides may be desirable for other considerations.

If the members 34 and 36 are not geared together, but are independently driven, as mentioned earlier, then the straight line motion need not be produced in moving the workpiece holder from one position to another position in a plane transverse to the axes of the shaft 27. However, the straight line motion will be produced whenever and so long as the members 34 and 36 are rotated at equal angular velocities in opposite directions. In order to move the workpiece holder from one position to another position in a plane transverse to the axis of the shaft 27 the total angular rotation of each of the members 34 and 36 will be the same whether the straight line motion is produced or not.

FIG. 6 shows the arrangement of one of the magazines, 30, in which cutting tools are stored. The magazine 30 comprises a disc which is rotatable about a spindle 51. The disc is provided with 12 recesses 52 into each of which a tool tip 53 is set. Each tip 53 may differ from the others in the magazine and can thus be used to perform a different cutting function on the workpiece 29. The disc 51 is rotated until the required cutting tip 53 comes into the cutting plane when the disc is locked in position. The workpiece 29 is then advanced to the cutting tip and material removing operations can begin.

By arranging cutting tool storage in two magazines 30 and 31 with the boring tools and drills in two other magazines 32 and 33, material removal operations can be carried out with one magazine of each pair while the other magazines are being serviced either removal of tips and tools which have worn or by the setting up of different tools and tips required for the following batch processing.

A further embodiment is shown in FIGS. 7, 8 and 9. The machine frame is again divided into two portions head stock 61 carrying a quill 62 and a tool portion 63 carrying six cutting tip discs 64, 65, 66, 67, 68 and 69, as well as two concentric rings of boring tools and drills 70 and 71. The quill 62 is again provided with a spindle 72 which is slidable therein and which has a chuck 73 holding a workpiece 74. Referring to FIG. 9, the quill 62 is located on a slide 75 which is operated by a hydraulic cylinder 76, although an electric actuator could be used. The slide 75 is movable across a plate 77 which can also be seen in FIG. 7 being separated therefrom by hydrostatic bearings 78. The plate 77 is rotatable within the headstock portion of the frame 61 in which it is rigidly held by hydrostatic bearings 79. Thus rotation of the plate 77 alters the inclination of the slide 75 and thus the inclination of the cutting plane. Indexing mechanism, which is not shown, is included so that the plate 77 can be rotated to bring the cutting plane into line with any of the discs 64 to 69. Since there are six of these discs, each containing 12 cutting tips, a total number of 72 alternative tools are available for carrying out metal removal work on the workpiece 74.

A further embodiment is shown in FIG. 10. A workpiece 81 is held by a rotatable chuck 82 carried by a quill 83 which is axially slidable within a head 84. The head 84 is carried on a vertical column 85, and is rotatably indexable thereon in a horizontal plane. The column 85 is supported for vertical movement in a framework 86 which is provided with an upstanding circular or part-circular flange 87 on which are carried a multiplicity of tools. Of these tools FIG. 10 shows a drill 88 and a cutting tool 89. By indexing the workhead 84 to any desired angular position in a horizontal plane any one of the multiplicity of tools can be selected for metal removing operations. FIG. 11 shows a plan view of a modification of FIG. 10 in which the circular arrangement has now been developed in a straight line. A workpiece 91 is held in a rotatable chuck 92 carried by a quill 93. The quill 93 is axially slidable within a workpiece head 94 which is able to traverse along a slide member 95 by means of a pinion which is not shown engaging with a rack 96, the pinion being driven by any suitable means. The workpiece head 94 is also vertically movable. A tool store 97 holds an arrangement of end tools 98 such as boring tools or drills and radial cutting tools 99. Thus by positioning the workhead 94 along the slide 95 and by advancing the quill 93 therethrough the workpiece can be presented to any one of a multiplicity of tools.

In FIG. 13 there is shown a multi purpose machine tool, comprising a head stock unit 101 and a tooling unit 102. In the head stock unit 101 a spindle 103 provided with a workpiece holder 104 in which is gripped a cylindrical workpiece 105 is driven by a fluid servo motor 106. The spindle 103 is movable in an axial direction as indicated by the double headed arrow 107, the hydraulic actuator being of any convenient type. Movement in a plane transverse to the axial movement indicated by the arrow 107 is obtained by mechanism generally similar to that disclosed in FIGS. 5 and 12 and also shown in FIG. 14 but, of course, other arrangements could be adopted.

A cylinder 117 is mounted in the head stock unit 101 to be rotatable about its longitudinal axis to any desired angular position. Mounted within the cylinder 117 for angular rotation about its axis is a cylinder 108 which performs the function of the cylinder 34 in FIGS. 5 and 12. Mounted eccentrically within the cylinder 108 for angular rotation about its axis is a further cylinder 109 which performs the function of the cylinder 36 in FIG. 5. The spindle 103 is carried eccentrically within the cylinder 109. The eccentricity of the axis of the spindle 103 in relation to the axis of the cylinder 109, and the eccentricity of the axis of the cylinder 109 in relation to the axis of the cylinder 108 are the same, and it is arranged that the cylinders 108 and 109 are driven through equal angular amounts and in opposite directions. The spindle 103 thus moves in a straight line in the plane of FIG. 14. Rotation of the cylinder 117 carries the cylinders 108 and 109 with it and thus carries the axis of the spindle 103 to the desired position. Thus, by equal and opposite angular rotations of the two cylinders 108 and 109 motion along a radial plane through the axis of the cylinder 108 is produced, and bodily rotation of the cylinders 117, 108 and 109 brings that radial plane into the position of the desired radial plane through the axis of the cylinder 108. It will be appreciated that the cylinder 117 is not essential to produce the motions described; it is merely necessary that, in addition to the equal and opposite angular rotation of the two cylinders 108 and 109 relative to the head stock unit 101 which produces straight line motion of the workpiece in the plane of FIG. 14 and relative to the head stock unit 101, there should be an additional rotation of the cylinder 108. Guides similar to 43 and 44 in FIG. 5 may be provided, but if the driving arrangements producing the opposite rotations of cylinders 108 and 109 relative to the head stock 101 necessarily produce the equal angular rotations referred to above then the guides are not essential. If the guides are provided then it may not be necessary to provide any driving means for rotating the cylinder 109 about its own axis since by rotating the cylinder 108 through the desired total amount relative to the head stock 101 the cylinder 109 will automatically be rotated through the desired angle relative to the cylinder 108 by means of the constraint imposed by the guides. However, it may be desirable to apply a rotational force to the cylinder 109 in the correct sense to cause it to rotate fully through the desired angle.

The tooling unit 102 comprises a block member 110 which is pivotable about vertical trunnion ends 111 and 112 which are respectively housed in a top frame 113 and a base plate 114. On three faces of the block member 110 there are provided plates 115. Two of the plates 115 are shown in FIG. 13 and the third is on the concealed rear face of the block member 110. Each of the plates 115 is provided with a range of fixed tools 118 for metal removal on the end face of the workpiece 105. On the fourth face of the block member 110 there is provided a plate 116 which carries a range of milling cutters 119 and a range of rotatable drills 120 which are individually driven, when the block is rotated so that they oppose the end face of the workpiece 105, by hydraulic motors, which are not indicated in these diagrammatic drawings. The top plate 113 is also provided with an attachment 121 containing a hydraulic motor driving a milling attachment 122 while the head stock 101 has four stations 123, 124, 125 and 126. Each of these stations contains a plurality of fixed stationary radial cutting tools, the arrangement being similar to that shown in FIG. 6.

In FIG. 15 the arrangement is slightly different since the four stations 123, 124, 125 and 126 have been removed from the head stock 101 and have been substituted for one of the plates 115 on the tooling unit 102. Thus the block 110 contains only two plates of fixed tools together with one plate containing driven tools 119 and 120 and a fourth plate containing stations with radial tools 123, 124, 125 and 126.

Radial metal removal is obtained by the tools housed on the stations 123, 124, 125 and 126, while referring to the arrangement in FIG. 15 which represents the preferred embodiment, metal is removed from the center of the workpiece 105 by any of the fixed tools on the tool faces housing them on the block 110. If it is required to use a tool housed on one of the other plates then the block 110 is rotated by any convenient means about the trunnions 111 and 112 until the requisite plate which can be locked in position is facing the head stock unit 101.

The fluid servo motor 106 is capable of rotating the spindle 103 about any desired angle and of holding it in such a position. This ability combined with the function of the eccentric cylinders 108 and 109 to traverse the holder 104 to any desired position in a plane transverse to the direction of the arrow 107 enables the workpiece 105 to be presented to any of the driven tools 119 and 120 which can thereby drill off-center holes, cut grooves, box cams etc. Finally, the milling cutter 122 with its separate drive can remove metal radially while the workpiece is held stationary thus enabling it to cut keyways, splines, oil grooves, etc. In addition by combining the features of the fluid servo motor 106 and of the hydraulic actuator giving the holder 104 and workpiece 105 axial movement, it is possible to cut threads and spiral grooves in the workpiece by using suitable tools in any of the stations 123, 124, 125 or 126.

It will thus be seen that a machine tool with the features described can perform almost any desired function on a workpiece which is gripped in the holder 104. In the embodiments shown, allowance has been made for a maximum length of finished component of 10 inches being cut from a workpiece cylinder of 10 inches diameter, this being considered a convenient maximum size for the production of a wide range of components.

In very general and superficial terms an analogy could be drawn between the way in which a workpiece is converted into a finished component by successive specialized machining operations in transfer machines and the way in which a workpiece is dealt with in the machines described herein. In transfer machines a workpiece mounted on a pallet is conveyed from machine to machine, each machine having a different specialized tooling system to carry out different specialized machining operations on the workpiece until the finished component is produced. The analogy with the machines of the present invention is that in both cases the workpiece is rigidly held and accurately located in workpiece holding means and is moved successively from one work station to another work station at each of which there is provided a specialized tool or tools for carrying out specific machining operations. The essential and important difference as will have been seen is that in the present invention successive work stations are in the same machine so that much more flexible operation of the machine is possible leading to more economical batch production than would be possible with a line of transfer machines which are much more inflexible and suitable only for relatively long production runs. In the machines of the present invention the changes necessary to produce a large number of different components are within the control capability of the machine.

In FIG. 16 there is shown diagrammatically a further form of data controlled machine tool which has many similarities to the machines shown in FIGS. 13, 14 and 15. The machine bed 201 supports a headstock unit 202 and a member 203, the unit 202 and the member 203 being tied together by a bridge piece 204. The member 203, which in this case has four faces, three 205, 206 and 207 being shown, can have as many faces as convenient and is rotatable about vertical trunnions 208 and 209. The headstock unit 202 is provided with a spindle 210 to which can be attached a tool holding collet 211. The spindle 210 is driven by a hydraulic motor 212 and is movable along its axis which is one of three orthogonal directions in which it is capable of being moved. Movement in the other two of the three orthogonal directions is achieved by any suitable mechanism such as those described above.

On the face 205 of the member 203 is a detachable face plate 213 containing a plurality of tools 214 such as milling cutters, drills, boring tools, etc. with their shanks directed towards the holder 211. 215 is a datum surface. The method of selecting a tool and of datuming its free end so that it is fixed in the holder 211 at a predetermined distance therefrom is as disclosed in U.S. Pat. No. 3,241,451 issued Mar. 22, 1966. In brief, the holder 211 extracts the selected tool and brings it up to the datum surface 215 so that the free end of the tool is at a predetermined fixed distance from the tool holder. The face 206 is provided with a further detachable face plate 216, which may be a pallet, having fixed thereto a workpiece 217. The datum surface 215 could equally well be fixed to the face plate 216. As soon as the selected tool is positioned in the holder 211 the member 203 is rotated by means, which are not shown, through 90° so that the workpiece 217 is opposed to the holder 211. Material removal can then proceed in accordance with the input instructions fed to the control equipment, which is again not shown and which controls movement of the selected tool in any of the three orthogonal directions. While the workpiece 217 is being fashioned into a component a further workpiece can be loaded onto faceplate 218 attached to the face 207 of the member 203. This faceplate might also be a pallet, the location of which on the face 207 is effected as disclosed in U.S. Pat. No. 3,243,178 issued Mar. 29, 1966 the location of pallet 216 being similarly obtained. Thus the machine shown is a controlled machine tool with a form of transfer apparatus.

If it is desired to use the machine in a similar way to the machine tool disclosed in FIGS. 13, 14 and 15 it is necessary to remove the tool holder 211 which is replaced by a workpiece holder. Alternatively, a form of holder may be used which can act either as a tool holder or as a workpiece holder. The faceplates 213, 216 and 218 are replaced with further plates such as the plates 115 and 116 shown in FIG. 15. One of the faces of the member 203 could also carry radially-disposed cutting tools as are shown at 123 and 124 in FIG. 15.

A further embodiment as illustrated in FIG. 26 is obtained by fitting a workpiece holder 105 at the opposite end of the spindle 210 to the tool holder 211. The headstock unit 202 is provided with trunnions 258 and 259 similar to those fitted to the member 203, whereby it may be rotated through 180° to present the workpiece to a face of the member 203 provided with turning tools, drills, etc. These could, for instance, be held on the fourth, and unshown, face of the member 203. In a further embodiment, in place of the member 203 which has four faces, a member with a greater number of faces, such as eight, is provided. In this case four of the faces carry tools in similar manner to the four faces of the block 110 in FIG. 15, and the other faces are as the four faces of the member 203 in FIG. 16.

The machine tool shown in FIGS. 17, 18 and 19 comprises a headstock 310 integral with a base portion 311 and with a support arm 312. At the end of the support arm 312 remote from the headstock 310 is an enlarged boss 313, and rotatably mounted therein is the upper end 314a of a vertical shaft 314. Vertically below the bass 313 the base 311 is recessed to receive the lower end 314b of the shaft 314. The shaft 314 has an enlarged cylindrical middle portion 314c, and mounted on the portion 314c is a cylindrical tool-carrying turret 315 which has a circular flange 315a. The cylindrical turret 315 is composed of a plurality of (in this case five) inverted substantially L shaped members 316, the long sides of the members 316 together forming the cylinder, and the short sides extending outwardly to form the flange 315a. The members 316 may be secured in place by any convenient means, such as set-screws, or by a clamp. A flange 314d on the shaft 314 supports the weight of the members 316 and, for example, vertical locating pegs on the flange 314d could fit into holes in the members 316 which could be held together by a clamp passing around the flange 315a.

Each of the members 316 has extending therefrom rows of tools such as boring bars, drills and screw-cutting heads, most of the tools being different. When the members 316 are in place the tools are arranged in horizontal rows and vertical rows and extend radially from the turret.

A rotatable workpiece holder is shown at 317 carried at one end of a rotatable shaft 318. A hollow workpiece 319 is shown in position in the workpiece holder 317. The holder 317 is movable vertically by means which are not shown from the chain line position in FIG. 17 to the full line position. The rotatable shaft 318 is carried by means capable of movement in the direction of the x axis so that the workpiece holder 317 is movable in a vertical plane containing the X axis. This means may be a hydraulic actuator or a lead screws or any other means of obtaining linear movement but is preferably the first alternative.

Turning tools 320 are rigidly fixed to the flange 315a while boring bars, drills, reamers, etc., 321, extend radially from the turret 315.

The turret 315 is mounted in the boss 313 by means of a bearing 322 and in the base 311 by bearings 323 and 324, of which 323 is a thrust bearing to take the load of the turret 315 and the shaft 314. The shaft 314, and thus the turret 315, which is rotatable by a hydraulic motor 325 is capable of indexing the assembly to any required position and of holding it locked in that position.

The operation of the machine is as follows. A workpiece 319 is loaded in the holder 317 and taped instructions are fed into the control consol which is not shown. If the first operation is, for example, diameter reduction then the turret 315 is indexed by means of the hydraulic motor 325, a hydraulic power pack and automatically operated valve (neither of the latter being shown) until a selected tool 320a is aligned with the axis of the workpiece holder 317. The tip of this tool 320a is, in fact, moved in a plane transverse to the plane of the drawing of FIG. 17 until it is in the vertical plane passing through the axis of the workpiece holder 317.

It will thus be seen that the finite cutting plane is the plane defined by the X and Y axes. To remove material from the workpiece 319 it is necessary to rotate the spindle 318 and to move the holder 317 in the finite cutting plane only, the rotation and the movements being achieved as disclosed in the same aforementioned application.

On completion of the operation using the turning tool 320a it may be necessary to use a boring bar 321a (FIG. 17). The spindle 318 is moved vertically downwards in the finite cutting plane until its axis is in the same horizontal plane as that of the boring bar 321a and at the same time the turret 315 is indexed by the rotary hydraulic ball motor 325 so that the axis of the boring bar 321a is parallel with the axis of the spindle 318 and in the finite cutting plane. The rotary hydraulic ball motor 325 comprises balls which are movable radially in cylinders under oil pressure, the balls being in contact with an outer circumferential cam track so that the application and releasing of oil pressure causes the balls to run along the cam track and rotate the motor. By rotating the workpiece holder 317 and by advancing it towards the turret 315 and the boring bar 321a the latter is brought into cutting engagement with the hollow workpiece 319. By moving the holder 317 vertically upwards the equivalent of tool feed is achieved and the surplus material is removed.

If the workpiece were solid it would be necessary to drill it first before boring is carried out. Consequently drills of all requisite sizes are carried by the turret 315.

A further embodiment is shown in the remaining figures. The machine tool comprises a body 401 having a gap 402 and an upstanding end frame 403. A workpiece 404 is fixed in a workpiece holder 405 which is integral with one end of a rotatable spindle 406 driven by a hydraulic motor (now shown). The spindle 406 is journalled in a headstock block 407. Fixed to the block 407 is a recirculating ball nut (not shown) through which runs a lead screw 408. The screw 408 is journalled at its ends in pedestals 409 and 410 and is driven in the latter by an indexing hydraulic servo motor (which is not shown). The pedestals 409 and 410 are part of a cross movement carriage 411 (see FIG. 22). The carriage 411 is provided with hydrostatic slide surfaces 412 and 413 on which the headstock block 407 is movable in a direction transverse to the plane of the sheet on which FIG. 20 is drawn.

A second recirculating ball nut is fixed to the underside of the carriage 411 and through it runs a second lead screw 414, the two ends of which are journalled in the body 401. A second hydraulic indexing servo motor (not shown) drives the screw 414. The body 401 is provided with two hydrostatic slide surfaces 415 and 416 on which the carriage 411 is movable in a direction transverse to the plane of the sheet on which FIG. 22 is drawn.

A third lead screw 417 is journalled in the end frame 403 and runs through a third recirculating ball nut (not shown) fixed to the underside of a vertical slide 418. A pallet 419 can be accurately located on and clamped to the slide 418 as disclosed in our U.S. Pat. No. 3,243,178 issued Mar. 29, 1966. As can be seen in FIG. 21 the pallet 419 is "L" shaped in section with the shorter arm having securely fixed thereto seven turning tools 420. Thus the configuration is such that the turning tools 420 can each be brought into radial relationship with the workpiece 404 by raising or lowering the slide 418. On the longer arm of the "L" are firmly fixed five boring bars 421 and five drills 422. It will be readily seen that the configuration is such that by raising or lowering the slide 418 and by moving the carriage 411 and by moving the block 407 on the carriage 411 each of these boring bars 421 and drill 422 can be caused to be in axial alignment with the workpiece 404.

The slide 418 is adapted to receive any one of a multiplicity of pallets, all of which have identical mechanism for location and clamping but each of which can be set up with an individual range of cutting tools such as turning tools, drills, reamers, screw cutting attachments, boring bars, grinding wheels, buffs etc. An alternative arrangement of a pallet 419 is shown in FIG. 23. An additional arm 423 has provision for two extra turning tools.

In operation the machine shown in FIGS. 20, 21 and 22 is similarly linked to a programmed controller and to a hydraulic power pack and regulating valves, none of which are shown. For each different workpiece and finished component a suitable pallet 419 is chosen and fitted to the slide 418, this pallet being provided with a range of tools. As in the other embodiment for peripheral material removal from the workpiece the turning tool is moved vertically either upwards or downwards according to whether the tool tip is directed upwards or downwards, by movement of the slide 418. Traversing movement is achieved by movement of the carriage 411 transversely of the plane of the sheet on which FIG. 22 is drawn. Movement of the block 407 aligns the workpiece and a desired tool whereas movement of the carriage 411 leftwards as seen when viewing FIG. 20 causes material removal by and of the boring bars 421 or drills 422.

In FIG. 24 there is shown diagrammatically and in perspective view another embodiment of a data controlled multipurpose machine tool. The machine comprises a baseplate 501 on which is mounted a further member 502. Fixed in a vertical position at the ends of the member 502 are two rigid plate members 503 in which is journalled for rotation about its horizontal axis 504 an internal shaft which cannot be seen in the figure. Mounted on the shaft for rotation therewith is a block member 505 and also mounted on the shaft at each end for rotation therewith are two face plate members 506. The block 505 and the member 502 are rotatable about a vertical axis 515.

The baseplate 501 is T shaped and has fixed to the cross portion of the T a further member 507 which is provided with a slideway 508 parallel to the horizontal axis 504. A headstock housing 509 in the form of an open-sided box having vertical side walls 510 is mounted on the slideway 508 for horizontal sliding movement. Within the box 509 and adapted for vertical sliding movement along vertical slideways 511 on the inner surfaces of the walls 510 is a member 512 which carries a headstock unit 513 thereon for horizontal sliding movement transversely of the axis 504. A spindle 514 driven by a motor, which for the sake of clarity is not shown, is carried in the headstock unit 513. The end of the spindle 514 is adapted to carry a cutting tool or a workpiece, either of which can be fixed to the spindle 514 by known means. The spindle 514 is also provided with means to enable it to move in either direction along its own axis.

The faces of the block 505 transverse to the two members 506 are adapted either to carry workpieces or to be fitted with detachable face plates carrying a plurality of milling cutters, drills, boring tools etc. and a datum pad, or lathe tools. Thus, any of the faces of the block 505 may be similar to any of the faces of the blocks 110 and 203 in FIGS. 13, 15 and 16. The block 505 could have more than four faces. Two of these faces, 516 and 517, can be seen in FIG. 24. In addition the two plate members 506 are adapted to hold either a workpiece as shown in FIG. 24 or a face plate having a plurality of lathe cutting tools.

Thus a workpiece carried on either of the plate members 506 can be machined on the four faces transverse to the member's own face by a milling tool held and rotated by the spindle 514. The fifth exposed face can be machined by rotating the block member 505 about its vertical axis 515 through 90° so as to bring that face opposite to the spindle 514. Alternatively if the block 505 is not arranged for rotation about a vertical axis then the workpiece must be removed from the plate member 506 and be fixed to one of the faces 516, 517 or the two faces opposite thereto. A workpiece carried on one of the faceplates 506 can be machined while another workpiece is being loaded on, or taken off, the other faceplate 506. Similarly, a workpiece on one of the faces transverse to the faceplates 506 may be machined while another workpiece is being put on, or taken off, another of these faces. The tools may be datummed in the manner described for FIG. 16.

One or more of the tools carried on one of the faces transverse to the faceplates 506 may be rotated for machining a workpiece carried by the spindle 514, for example, the tool may be a drill for drilling holes off the axis of rotation of the workpiece.

If the block is rotatable about its vertical axis then it is possible to machine at an angle a workpiece on one of the faceplates 506.

For numerical control of the machine tool to be effective in those cases in which the workpiece rotates it is necessary that the cutting tip, whether of a radial, an end tool, or a milling cutter, has a location in three dimensional space known to the control unit. The location in two dimensions depends on the geometry of the pallet, faceplate, disc etc. in which it is held while the location in the third dimension, i.e. axially in the case of end tools and radially in the case of radial cutting tools, depends upon the original manual setting. In all embodiments provision can readily be made for setting up duplicate tools in unused positions so that long before there is sufficient wear on a tool tip to impair the accuracy of the machining operation the replacement tool can be substituted for the one in use.

Accurate location of the tips of milling cutters embodied in the machine illustrated in FIG. 16 is as disclosed in U.S. Pat. No. 3,241,451 issued Mar. 22, 1966.

We claim:

1. In a data-controlled machine tool wherein automatic control means responsive to a data input for selecting tools and controlling movement of a workpiece is provided, comprising support means, a workpiece holder mounted on said support means, means to rotate said workpiece holder, a plurality of tools, means for mounting said tools on said support means, and means for moving said workpiece holder in at least two orthogonal directions so that the geometric center of the workpiece can move to and remain in each and every point of a finite cutting plane of a selected tool which cutting plane is defined by the workpiece axis and the selected tool tip.

2. A data-controlled machine tool as claimed in claim 1 wherein said means for moving said workpiece holder is capable of moving said holder in three orthogonal directions whereby the workpiece can move into the cutting plane of any selected one of said tools.

3. A data-controlled machine tool as claimed in claim 2 wherein one of said orthogonal directions for movement of said workpiece holder is in the direction of its rotational axis (X), and said two remaining orthogonal directions (Y and Z) are mutually perpendicular to the rotational axis of the workpiece, the movements along the X, Y and Z axes cooperating to bring a selected tool into opposition to the workpiece so that it can perform a machining operation thereon.

4. A data-controlled machine tool as claimed in claim 3 wherein said mounting means for a plurality of tools comprises two tool-carrying surfaces, one being disposed at an angle to the other, one surface having turning tools extending therefrom and the other having tools, of other types, at least the selected tool extending in a direction parallel to the rotational (X) axis.

5. A data-controlled machine tool as claimed in claim 4 wherein said mounting means for a plurality of tools comprises a cylindrical turret, one surface being the surface of said cylindrical turret which has said other tools extending radially therefrom and arranged in horizontal and vertical rows, the other surface being on an annular flange of the cylinder, a single row of turning tools extending from the flange parallel with the axis of the turret, the turret being rotatably mounted on said support means with its axis vertical, the workpiece holder being movable vertically (Y axis) so that, together with rotation of the turret, any tool carried by the turret may be selected.

6. A data-controlled machine tool as claimed in claim 4 wherein said mounting means for a plurality of tools comprises a pallet having said two surfaces, the surface from which extend the turning tools being vertical and at one side of the pallet and carrying a single vertical row of turning tools, the other surface being perpendicular thereto and extending in the direction of the Y and Z axes and carrying tools arranged in a plurality of vertical and horizontal rows, the pallet being carried by means capable of vertical movement (Y axis), and the workpiece holder being carried by a cross slide permitting movement in the direction of the Z axis.

7. A data-controlled machine tool as claimed in claim 6 comprising a plurality of interchangeable tool-carrying pallets.

8. A data-controlled machine tool as claimed in claim 1 wherein means is provided for moving the workpiece holder along its rotational axis and in a vertical plane, and wherein said mounting means for a plurality of tools comprises a tool turret indexable about a vertical axis displaced from said rotational axis, said turret having a plurality of vertical faces from which said tools extend horizontally, the turning tool in use at any instant being arranged with its shank tangential to the surface of the workpiece and with its cutting tip in the vertical plane of movement of the workpiece.

9. A data-controlled machine tool as claimed in claim 8 wherein at least one face of the turret carries tools for working on the end face of the workpiece.

10. A data-controlled machine tool as claimed in claim 8 wherein means is additionally provided for moving the workpiece in a horizontal plane and the cutting tools are arranged radially of the workpiece.

11. A data-controlled machine tool as claimed in claim 8 comprising means for moving the workpiece holder along its rotational axis and in two other directions mutually perpendicular to its rotational axis and wherein said mounting means for a plurality of tools comprises a block member opposed to the workpiece holder and having a plurality of faces with tools thereon, the block member being pivotably mounted so as to present each of its faces and the tools thereon separately to the workpiece holder, and other tools are disposed radially of the rotational axis of the workpiece holder.

12. A data-controlled machine tool as claimed in claim 11 wherein the workpiece holder includes means for gripping a workpiece, a tool, and a tool holder alternatively, and at least one face of the block includes means for carrying a plurality of tools from which said toolholder can select and withdraw a tool, datuming means to cause the toolholder to grip the selected tool firmly with its free end at a predetermined distance from the holder, and workpiece holding means on at least one other face of the block member which can be opposed to the toolholder for the selected tool gripped in the toolholder to remove material from the workpiece.

13. A data-controlled machine tool as claimed in claim 12 wherein the block member is mounted for pivoting on a shaft which also carries a faceplate at each end of the block, the faceplate being adapted to carry a workpiece.

14. A data-controlled machine tool as claimed in claim 13 wherein the block member is pivotable about an additional axis perpendicular to the axis of the shaft so that a faceplate may be brought into a position perpendicular to the axis of rotation of the toolholder.

15. A data-controlled machine tool as claimed in claim 8 comprising means for moving the workpiece holder along its axis of rotation and in two other directions perpendicular to each other and to the axis of rotation so that the workpiece holder is movable in a plane perpendicular to the rotational axis of the workpiece holder, the means to rotate said workpiece holder comprising a rotatably mounted first cylindrical member, a rotatable shaft mounted eccentrically of the axis of rotation of said first cylindrical member, a rotatably mounted second cylindrical member, the first cylindrical member being rotatably mounted in said second cylindrical member eccentrically of the axis of the second cylindrical member, the second cylindrical member being itself mounted for rotation about its axis, whereby rotation of the two cylindrical members causes the axis of the workpiece holder to be moved in both the said two other directions.

16. A data-controlled machine tool as claimed in claim 1 wherein means is provided for moving the workpiece holder along its rotational axis and in a direction at right angles to its rotational axis so that the workpiece is movable to any position in a plane, and wherein turning tools are disposed at two positions in the plane and on opposite sides of the workpiece holder so that the workpiece can be moved to a turning tool at either position to be machined thereby.

17. A data-controlled machine tool as claimed in claim 16 wherein end tools are also disposed in the plane so that the workpiece can be brought to a selected end tool to be machined thereby.

18. A data-controlled machine tool as claimed in claim 17 wherein the end tools are mounted on a rotatable indexable turret arranged with its axis of rotation in said plane.

19. A data-controlled machine tool as claimed in claim 1 further comprising means for moving the workpiece holder along its rotational axis and in two other directions at right angles to each other and to the rotational axis so that the workpiece can be moved to any position in a plane at right angles to the rotational axis, and wherein said plurality of tools comprises turning tools mounted in said plane at positions spaced apart around the rotational axis of said workpiece holder so that the workpiece can be moved to any one of said tools to be machined thereby.

20. A data-controlled machine tool as claimed in claim 19 wherein said plurality of tools further comprises a cluster of end tools extending in the direction of the rotational axis of said workpiece holder, the tools extending from a face at right angles to the rotational axis and displaced in the direction of the rotational axis from the plane of the turning tools.

21. A data-controlled machine tool as claimed in claim 19 wherein the turning tools at each position are in the form of a rotatable indexable disc having cutting tips disposed around its periphery, the disc being mounted with its axis of rotation in said plane.

22. A data-controlled machine tool as claimed in claim 1 further comprising means for moving the workpiece holder along its rotational axis to produce the cutting plane and for also moving the holder in a vertical direction and wherein additionally the workpiece holder is rotatably indexable about a vertical axis passing through its rotational axis, said plurality of tools comprising turning tools disposed around the vertical axis so that rotation of the workpiece about its vertical axis brings the workpiece into the cutting plane of the selected turning tool.

23. A data-controlled machine tool as claimed in claim 22 wherein said plurality of tools further comprises end tools disposed radially of the vertical axis so that rotation of the workpiece about its vertical axis brings the end face of the workpiece into a position to be operated on by the selected end tool.

24. A data-controlled machine tool as claimed in claim 3 comprising means for moving the workpiece holder along its rotational axis and in a vertical direction to produce the cutting plane and in the horizontal direction mutually perpendicular to its two other directions of movement.

25. A machine tool for removing material from a workpiece while being rotated, comprising
   a. a machine base means,
   b. means mounted on said base means for simultaneously securing a plurality of tools, each at a different location and each having a cutting tip, and
   c. means mounted on said base means for rotating said workpiece about an axis, said axis being at a fixed position relative to said workpiece, and for moving said workpiece in at least two orthogonal directions, one of said directions being in the direction of said axis and the other of said directions being in the plane defined by said axis and the cutting tip of a tool,
   d. whereby the workpiece can be moved into engagement with the cutting tip of any selected one of said tools at one of said locations, and the cutting tip of said selected tool has access to every point in a predetermined cutting plane passing through said workpiece.

26. A machine tool for removing material from a workpiece while being rotated, comprising
   a. a machine base means,
   b. means mounted on said base means for simultaneously securing a plurality of tools, each at a different location and each having a cutting tip,
   c. a workpiece holder, and
   d. means supporting said workpiece holder on said base means for rotating said workpiece holder about an axis, said axis being at a fixed position relative to said workpiece holder, and for moving said workpiece holder in at least two orthogonal directions, one of said directions being in the direction of said axis and the other of said directions being in the plane defined by said axis and the cutting tip of a tool,
   e. whereby with movement of a workpiece mounted on said workpiece holder said workpiece is moved into engagement with any selected one of said tools at one of said locations, and the cutting tip of said selected tool has access to every point in a predetermined cutting plane.

27. A machine tool as claimed in claim 26 wherein said support means comprises means supporting said workpiece holder for movement in three orthogonal directions whereby with movement of a workpiece mounted on said workpiece holder the cutting tip of said selected tool has access to any selected cutting plane and to every point in said selected cutting plane.

28. A machine tool as claimed in claim 26 wherein said support means comprises a first support means supporting said workpiece holder for said rotation about said axis and a second support means supporting said workpiece holder for movement in said orthogonal directions.

29. A machine tool as claimed in claim 28 wherein said first support means is mounted for movement in said orthogonal directions on said second support means.

30. A machine tool as claimed in claim 28 wherein said first support means comprises a third support means supporting said workpiece holder for movement axially and a fourth support means supporting said workpiece holder for movement perpendicularly to said axial direction.

31. A machine tool as claimed in claim 30 wherein said third support means is mounted for movement perpendicularly to said axial direction on said fourth support means.

32. A machine tool as claimed in claim 26 wherein said support means comprises means supporting said workpiece holder for movement axially and means supporting said workpiece holder for movement perpendicularly to said axial direction.

33. A machine tool as claimed in claim 32 wherein said means supporting said workpiece holder for perpendicular movement supports and moves perpendicularly to said axis said means supporting said workpiece holder for axial movement.

34. A machine tool as claimed in claim 26 wherein said means supporting said workpiece holder comprises a first slide means transverse to said rotational axis, said workpiece holder being mounted for movement along said first slide means, and a second slide means transverse to said rotational axis and first slide means, said first slide means being mounted for movement along said second slide means, whereby said first and second slide means permit movement of said workpiece holder in two orthogonal directions perpendicular to said axial direction.

35. A machine tool as claimed in claim 34 wherein said means supporting said workpiece holder further comprises means supporting said workpiece holder mounted on said first slide means permitting movement of said workpiece holder in said axial direction.

36. A machine tool as claimed in claim 35 wherein said means supporting said workpiece holder further comprises means supporting said workpiece holder for rotation, said rotation support means being mounted on said means supporting said workpiece holder for movement in said axial direction.

37. A machine tool for removing material from a workpiece while being rotated, comprising
a. a machine base means,
b. means mounted on said base means for securing at least one tool having a cutting tip,
c. a workpiece holder, and
d. means supporting said workpiece holder on said base means for rotating said workpiece holder about an axis, said axis being at a fixed position relative to said workpiece holder, and for moving said workpiece holder in at least two orthogonal directions, one of said directions being in the direction of said axis,
e. said support means supporting said workpiece holder comprising a first rotatable element, a second rotatable element eccentrically positioned with respect to said first rotatable element and a third element supporting said workpiece holder for movement in said axial direction eccentrically positioned with respect to said second rotatable element,
f. whereby rotation of said first and second elements causes said workpiece holder to move perpendicularly to its rotational axis and with movement of a workpiece mounted on said workpiece holder the cutting tip of said tool has access to every point in a predetermined cutting plane.

38. A machine tool as claimed in claim 37 comprising plate means, said first rotatable element comprising an outer circular member rotatably mounted within said plate means, said second rotatable element comprising an inner circular member eccentrically mounted within said outer member, said third element comprising a quill eccentrically mounted within said inner member for movement in said axial direction, said machine tool further comprising a spindle concentrically and rotatably mounted in said quill for rotatably supporting said workpiece holder.

39. A machine tool as claimed in claim 37 wherein the distance between the rotational axes of said first and second rotatable elements is equal to the distance between the axis of said second element and the rotational axis of said workpiece holder, whereby said workpiece holder may be moved in a straight line perpendicularly to its rotational axis by rotation of said first and second elements in opposite directions.

40. A machine tool as claimed in claim 39 further comprising driving means for rotating said first and second elements in opposite directions with equal angular velocity to cause said workpiece holder to move in a straight line perpendicularly to its rotational axis.

41. A machine tool as claimed in claim 37 further comprising driving means for rotating said first and second elements in opposite directions at relative angular velocities such as to cause said workpiece holder to move in a straight line perpendicularly to its rotational axis.

42. A machine tool as claimed in claim 37 further comprising a sliding member attached to said third element and linear slide means for guiding and preventing rotation of said sliding member whereby rotation of said third element is prevented as it moves along a linear path perpendicular to the rotational axis of said workpiece holder by rotation of said first and second elements.

43. A machine tool as claimed in claim 42 comprising a further rotatable means having an axis of rotation parallel to the axes of rotation of said first and second rotatable elements and of said workpiece holder, said linear slide means being mounted on said further rotatable means whereby the direction of said linear path along which said third element moves may be adjusted.

44. A machine tool for removing material from a workpiece while being rotated, comprising
a. a machine base means,
b. means mounted on said base means for securing at least one tool having a cutting tip,
c. a workpiece holder, and
d. means supporting said workpiece holder on said base means for rotating said workpiece holder about an axis, said axis being at a fixed position relative to said workpiece holder, and for moving said workpiece holder in at least two orthogonal directions, one of said directions being in the direction of said axis,
e. said support means supporting said workpiece holder comprising a rotatable element having an axis of rotation substantially parallel to the rotational axis of said workpiece holder, slide means on said rotatable element for movement perpendicularly to its axis of rotation, and means mounted on said slide means for supporting said workpiece holder for rotation of said workpiece holder,
f. whereby with movement of a workpiece mounted on said workpiece holder the cutting tip of said tool has access to every point in a predetermined cutting plane.

45. A machine tool as claimed in claim 44 wherein said support means further comprises means mounted on said slide means permitting movement of said workpiece holder in said axial direction.

46. A machine tool as claimed in claim 26 wherein said support means comprises first slide means for movement in a direction perpendicular to said axis of rotation, second slide means mounted on said first slide means for movement in said axial direction, and means mounted on said second slide means rotatably supporting said workpiece holder.

47. A machine tool as claimed in claim 26 wherein said means securing a plurality of tools comprises at least one rotatably mounted member for retaining said tools in spaced relationship whereby at least one of said plurality of tools may be positioned at any one time for engagement by a workpiece on said workpiece holder.

48. A machine tool as claimed in claim 47 wherein said member is mounted for rotation about an axis transverse to the rotational axis of said workpiece holder and comprises a plurality of faces, each face comprising means for mounting a plurality of tools.

49. A machine tool as claimed in claim 47 wherein said means securing a plurality of tools comprises a plurality of rotatable mounted members, each said member comprising means for mounting a plurality of tools about its periphery, whereby simultaneously at least one of said plurality of tools on each member may be positioned for engagement by a workpiece of said workpiece holder.

50. A machine tool as claimed in claim 49 wherein said means for mounting said plurality of tools about the periphery of each of said rotatably mounted members comprises a plurality of recesses in the periphery of said rotatable member, each for receiving a least one tool tip.

51. A machine tool as claimed in claim 49 wherein at least one of said rotatably mounted members is mounted for rotation about an axis substantially perpendicular to the rotational axis of said workpiece holder.

52. A machine tool as claimed in claim 49 wherein at least one of said rotatably mounted members is mounted for rotation about an axis substantially parallel to the rotational axis of said workpiece holder.

53. A machine tool as claimed in claim 49 comprising at least one pair of said rotatably mounted members, the rotational axis of one of said pair of members being substantially perpendicular to the rotational axis of said workpiece holder, said one member being adapted to retain boring tools and drills, and the rotational axis of the other of said pair of members being substantially parallel to the rotational axis of said workpiece holder, said other member being adapted to retain a plurality of cutting tools.

54. A machine tool as claimed in claim 53 comprising a plurality of said pairs of rotatably mounted members whereby tools retained in one pair may be replaced while tools retained in the other pair are in use.

55. A machine tool for removing material from a workpiece, comprising
  a. a machine base means,
  b. a head stock unit mounted on said base means for supporting a workpiece, and
  c. a tooling unit mounted on said base means for simultaneously supporting a plurality of tools, each at a different location relative to the other tools and each having a cutting tip,
  d. said head stock unit comprising means for rotating said workpiece about an axis, said axis being at a fixed position relative to said workpiece and for moving said workpiece in at least two orthogonal directions, one of said directions being in the direction of said axis and the other of said directions being in the plane defined by said axis and the cutting tip of a tool,
  e. said tooling unit including means for selectively positioning any one of said plurality of tools at one of said locations adjacent the workpiece on said head stock unit,
  f. whereby the workpiece can be moved into engagement with the cutting tip of a tool selected from a plurality of tools and said cutting tip has access to every point in a predetermined cutting plane passing through said workpiece.

56. A machine tool for removing material from a workpiece, comprising
  a. a machine base means,
  b. a head stock unit mounted on said base means for supporting a workpiece, and
  c. a tooling unit mounted on said base means for simultaneously supporting a plurality of tools, each at a different location relative to the other tools and each having a cutting tip,
  d. said head stock unit comprising a workpiece holder for rotation about an axis, said axis being at a fixed position relative to said workpiece holder and for movement in at least two orthogonal directions, one of said directions being in the direction of said axis and the other of said directions being in the plane defined by said axis and the cutting tip of a tool, and
  e. said tool unit including means for selectively positioning any one of said plurality of tools at one of said locations adjacent the workpiece on said workpiece holder,
  f. whereby the workpiece can be moved into engagement with the cutting tip of a tool selected from a plurality of tools and said cutting tip has access to every point in a predetermined cutting plane passing through said workpiece.

57. A machine tool as claimed in claim 56 wherein said support means comprises means supporting said workpiece holder for movement in three orthogonal directions whereby with movement of a workpiece mounted on said workpiece holder the cutting tip of said selected tool has access to any selected cutting plane and to every point in said selected cutting plane.

58. A machine tool as claimed in claim 56 wherein said support means comprises a first support means supporting said workpiece holder for said rotation about said axis and a second support means supporting said workpiece holder for movement in said orthogonal directions.

59. A machine tool as claimed in claim 58 wherein said first support means is mounted for movement in said orthogonal directions on said second support means.

60. A machine tool as claimed in claim 58 wherein said first support means comprises a third support means supporting said workpiece holder for movement axially and a fourth support means supporting said workpiece holder for movement perpendicularly to said axial direction.

61. A machine tool as claimed in claim 60 wherein said third support means is mounted for movement perpendicularly to said axial direction on said fourth support means.

62. A machine tool as claimed in claim 56 wherein said means supporting said workpiece holder comprises a first rotatable element, a second rotatable element eccentrically positioned with respect to said first rotatable element and a third element for supporting said workpiece holder for movement in said axial direction eccentrically positioned with respect to said second rotatable element, whereby rotation of said first and second elements cause said workpiece holder to move perpendicularly to its rotational axis.

63. A machine tool as claimed in claim 56 wherein said means supporting said workpiece holder comprises a first cylinder rotatably mounted on said head stock unit, a second cylinder eccentrically mounted for rotation on said first cylinder, and a third cylinder eccentrically mounted on said second cylinder for supporting said workpiece holder whereby rotation of said first and second cylinders causes said third cylinder and workpiece holder to move perpendicularly to the rotational axis of said workpiece holder.

64. A machine tool as claimed in claim 63 wherein said third cylinder is movable in the direction of the rotational axis of said workpiece holder.

65. A machine tool as claimed in claim 64 further comprising a spindle concentrically and rotatably mounted in said third cylinder for rotatably supporting said workpiece holder.

66. A machine tool as claimed in claim 63 wherein said means supporting said workpiece holder further comprises a fourth cylinder means rotatably mounted on said head stock unit, said first cylinder being rotatably mounted within said fourth cylinder means whereby said first, second and third cylinders may be rotated within said head stock unit.

67. A machine tool for removing material from a workpiece, comprising
   a. a machine base means,
   b. a head stock unit mounted on said base means for supporting a workpiece, and
   c. a tooling unit mounted on said base means for supporting a plurality of tools having cutting tips,
   d. said head stock unit comprising a workpiece holder and means supporting said workpiece holder for rotation about an axis and for movement in at least two orthogonal directions,
   e. said tooling unit being mounted for rotation about an axis transverse to the rotational axis of said workpiece holder and comprising means for securing said plurality of tools about the axis of the tooling unit,
   f. whereby the workpiece can be moved into engagement with the cutting tip of a tool selected from a plurality of tools and said cutting tip has access to every point in a predetermined cutting plane passing through said workpiece.

68. A machine tool as claimed in claim 67 wherein said tooling unit includes a plurality of faces about the axis of the tooling unit, each face including said means for securing a plurality of said tools, whereby any one of said faces may be selectively positioned adjacent the workpiece and said workpiece is caused to contact the cutting tip of a selected tool on the selected face by said means for rotating and moving said workpiece holder.

69. A machine tool as claimed in claim 56 wherein said head stock unit further comprises at least one means for securing at least one additional tool, whereby with movement of said workpiece by said support means the cutting tip of said additional tool has access to every point in a predetermined cutting plane passing through said workpiece.

70. A machine tool as claimed in claim 69 wherein said means for securing at least one additional tool comprises at least one rotatably mounted member for retaining a plurality of additional tools in spaced relationship, whereby at least one of said plurality of additional tools may be selectively positioned for engagement by said workpiece.

71. A machine tool as claimed in claim 67 wherein said means for securing said plurality of tools comprises means for securing and driving at least one of said tools.

72. A machine tool as claimed in claim 68 comprising at least one rotatable member mounted on at least one of said faces for rotation about an axis perpendicular to the axis of rotation of said tooling unit, said rotatable member including means for retaining a plurality of additional tools in spaced relationship, whereby at least one of said plurality of additional tools may be selectively positioned for engagement by said workpiece when said one face is positioned adjacent said workpiece.

73. A machine tool as claimed in claim 67 further comprising a power driven milling center mounted for rotation on an axis perpendicular to said axis of rotation of said workpiece holder for removing material radially from said workpiece while being held stationary.

74. A machine tool as claimed in claim 68 wherein at least one of the tools on at least one of said faces is power driven.

75. A machine tool as claimed in claim 65 wherein said head stock unit is mounted for rotation about an axis perpendicular to said rotational axis of said spindle, said head stock unit further comprising means for securing a tool, said tool securing means being mounted on one end of said spindle and the workpiece holder on the opposite end thereof, and said tooling unit is mounted for rotation about an axis transverse to the rotational axis of said workpiece holder and comprises means for retaining a plurality of tools and at least one further workpiece about the axis of the tooling unit, whereby any one of said tools may be selectively positioned adjacent said head stock unit for engaging the workpiece on said head stock unit and said tool securing means on said spindle may secure a selected tool from said tooling unit and cause said selected tool to engage said further workpiece on said tooling unit.

76. A machine tool as claimed in claim 75 further comprising datum means retained on said tooling unit whereby the free end of a tool retained in said tool securing means on said spindle may be datumed at a predetermined distance from said tool securing means.

77. In a data-controlled machine tool wherein automatic control means responsive to a data input for selecting tools and controlling movement of a workpiece is provided, comprising a machine base means, a workpiece holder mounted on said base means, means for rotating said workpiece holder and for moving said workpiece holder in at least two orthogonal directions, and means mounted on said base means for selectively positioning any one of a plurality of tools adjacent the workpiece on said workpiece holder, whereby the workpiece can be moved into engagement with the cutting tip of a tool selected from a plurality of tools and said cutting tip has access to every point in a predetermined cutting plane passing through said workpiece.

78. A machine tool as claimed in claim 26 wherein said means for securing a plurality of tools is adapted to support tools with their cutting tips directed parallel to the rotational axis of said workpiece holder when positioned for engagement by a workpiece.

79. A machine tool as claimed in claim 26 wherein said means for securing a plurality of tools is adapted to support tools with their cutting tips directed transverse to the rotational axis of said workpiece holder when positioned for engagement by a workpiece.

80. A machine tool as claimed in claim 67 wherein said means for securing a plurality of tools is adapted to support tools with their cutting tips directed parallel to the rotational axis of said workpiece holder when positioned for engagement by a workpiece.

81. A machine tool as claimed in claim 67 wherein said means for securing a plurality of tools is adapted to support tools with their cutting tips directed transverse to the rotational axis of said workpiece holder when positioned for engagement by a workpiece.

82. A machine tool as claimed in claim 26 wherein said means supporting said workpiece holder comprises a first slide means transverse to said rotational axis, said workpiece holder being mounted for movement along said first slide means, and a second slide means parallel to said rotational axis and transverse to said first slide means, said first slide means being mounted for movement along said second slide means, whereby said first and second slide means permit movement of said workpiece holder in two orthogonal directions.

83. A machine tool as claimed in claim 56 wherein said tooling unit is mounted for movement along a path transverse to said two orthogonal directions of movement of said workpiece holder and comprises means for securing said plurality of tools at spaced locations on said tooling unit, whereby any one of said tools may be selectively positioned adjacent the workpiece on said head stock unit.

84. A machine tool as claimed in claim 47 wherein said rotatably mounted member for retaining said tools is mounted for rotation about two axes which are transverse to each other.

85. A machine tool as claimed in claim 84 wherein said axes are perpendicular to each other.

86. A machine tool as claimed in claim 56 wherein said tooling unit is mounted for rotation about two axes which are transverse to each other and comprises means for securing said plurality of tools about the axes of the tooling unit, whereby any one of said tools may be selectively positioned adjacent the workpiece on said head stock unit.

87. A machine tool as claimed in claim 86 wherein said axes are perpendicular to each other.

88. A machine tool for removing material from a workpiece while being rotated, comprising
 a. a machine base means,
 b. means mounted on said base means for securing at least one tool having a cutting tip,
 c. a workpiece holder, and
 d. means supporting said workpiece holder on said base means for rotating said workpiece holder about an axis, said axis being at a fixed position relative to said workpiece holder, and for moving said workpiece holder in at least two orthogonal directions, one of said directions being in the direction of said axis,
 e. said support means supporting said workpiece holder comprising a rotatable element having an axis of rotation perpendicular to the rotational axis of said workpiece holder, slide means on said rotatable element for movement in said axial direction, and means mounted on said slide means rotatably supporting said workpiece holder,
 f. whereby with movement of a workpiece mounted on said workpiece holder the cutting tip of said tool has access to every point in a predetermined cutting plane.

89. A machine tool for removing material from a workpiece while being rotated, comprising
 a. a machine base means,
 b. means mounted on said base means for securing at least one tool having a cutting tip,
 c. a workpiece holder,
 d. means supporting said workpiece holder on said base means for rotating said workpiece holder about an axis, said axis being at a fixed position relative to said workpiece holder, nd for moving said workpiece holder in at least two orthogonal directions, one of said directions being in the direction of said axis,
 e. said means supporting said workpiece holder comprising a first slide means transverse to said rotational axis, said workpiece holder being mounted for movement along said first slide means, and a second slide means parallel to said rotational axis and transverse to said first slide means, said first slide means being mounted for movement along said second slide means, and
 f. said means for securing at least one tool comprising further slide means for having said tool in a direction transverse to both said first and second slide means,
 g. whereby said first and second slide means permit movement of said workpiece holder in two orthogonal directions and with movement of a workpiece mounted on said workpiece holder the cutting tip of said tool has access to every point in a predetermined cutting plane.

* * * * *